United States Patent
Matsuyama

(10) Patent No.: US 9,854,149 B2
(45) Date of Patent: Dec. 26, 2017

(54) IMAGE PROCESSING APPARATUS CAPABLE OF OBTAINING AN IMAGE FOCUSED ON A PLURALITY OF SUBJECTS AT DIFFERENT DISTANCES AND CONTROL METHOD THEREOF

(71) Applicant: CANON KABUSHIKI KAISHA, Tokyo (JP)

(72) Inventor: Ichiro Matsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 14/283,758

(22) Filed: May 21, 2014

(65) Prior Publication Data

US 2014/0354781 A1    Dec. 4, 2014

(30) Foreign Application Priority Data

May 28, 2013 (JP) ................................ 2013-112375

(51) Int. Cl.
*H04N 5/232* (2006.01)
(52) U.S. Cl.
CPC .............................. *H04N 5/23212* (2013.01)
(58) Field of Classification Search
None
See application file for complete search history.

(56) References Cited

U.S. PATENT DOCUMENTS

| | | | |
|---|---|---|---|
| 2006/0103728 A1* | 5/2006 | Ishigami | H04N 1/6027 348/180 |
| 2006/0232682 A1* | 10/2006 | Ono | H04N 5/23229 348/222.1 |
| 2008/0106620 A1* | 5/2008 | Sawachi | H04N 13/0257 348/262 |
| 2008/0192139 A1* | 8/2008 | Kanai | H04N 5/23212 348/360 |
| 2010/0165177 A1* | 7/2010 | Liaw | H04N 5/23212 348/349 |
| 2012/0033051 A1* | 2/2012 | Atanassov | H04N 13/0239 348/49 |

(Continued)

FOREIGN PATENT DOCUMENTS

| | | |
|---|---|---|
| JP | 2005-198334 A | 7/2005 |
| JP | 2009-088742 A | 4/2009 |
| JP | 2010-107862 A | 5/2010 |

(Continued)

OTHER PUBLICATIONS

Liang, Chia-Kai, et al., "Programmable aperture image capture: multiplexed light field acquisition" (ACM Transactions on Graphics (TOG), vol. 27, No. 3, ACM SIGGRAPH, 2008) Cited in Specification in paragraphs [0002][0004].

(Continued)

*Primary Examiner* — Stephen Coleman
(74) *Attorney, Agent, or Firm* — Cowan, Liebowitz & Latman, P.C.

(57) ABSTRACT

An image capture apparatus derives a frequency distribution of subject distances from captured images, selects a plurality of subject distances based on peaks in the frequency of appearance, and acquires a plurality of captured images whose focus distances are the plurality of selected subject distances, enabling an image focused on a plurality of subjects at different distances to be efficiently obtained.

12 Claims, 17 Drawing Sheets

(56) References Cited

U.S. PATENT DOCUMENTS

2012/0320253 A1* 12/2012 Park .................. H04N 5/23212
348/345

FOREIGN PATENT DOCUMENTS

| JP | 2010-128018 A | 6/2010 |
|----|---------------|--------|
| JP | 2010-154306 A | 7/2010 |
| JP | 2010-166519 A | 7/2010 |
| JP | 2012-095186 A | 5/2012 |
| JP | 2012-114882 A | 6/2012 |
| JP | 2014-119715 A | 6/2014 |

OTHER PUBLICATIONS

The above foreign patent documents were cited in the Mar. 21, 2017 Japanese Office Action, a copy of which is enclosed without an English Translation, that issued in Japanese Patent Application No. 2013112375.

* cited by examiner

CAPTURED IMAGE

SKY

FOREGROUND

PERSONS

IMAGE PROCESSING APPARATUS CAPABLE OF OBTAINING AN IMAGE FOCUSED ON A PLURALITY OF SUBJECTS AT DIFFERENT DISTANCES AND CONTROL METHOD THEREOF

BACKGROUND OF THE INVENTION

Field of the Invention

The present invention relates to an image capture apparatus and a control method thereof.

Description of the Related Art

Since depth of field is determined by a combination of various factors such as subject distance, aperture value, angle of view (focal length) and image sensor size, capturing an image in which a desired area on the screen is within the depth of field takes knowledge and experience, and is not easy. Japanese Patent Laid-Open No. 2009-88742 discloses an image capture apparatus which generates a single image by capturing the same scene a plurality of times while changing the focus distance, depth of field or the like, and extracting and combining the areas that are in focus within the obtained images. This image capture apparatus enables an image focused on a plurality of subjects at different distances to be obtained after image capture. Also, LIANG, Chia-Kai, et al., "Programmable Aperture Photography: Multiplexed Light Field Acquisition" (ACM Transactions on Graphics (TOG), Vol. 27, No. 3, ACM, 2008) describes an image capture apparatus in which a microlens array is arranged in front of the image sensor, and an image capture apparatus that performs image capture with different positions of the opening of the aperture. Based on the images captured with this image capture apparatus, the focus distance, depth of field or the like of an image can be changed after image capture, using light field photography.

With the image capture apparatus disclosed in Japanese Patent Laid-Open No. 2009-88742, image capture needs to be performed for various combinations of focusing lens position (focus position), aperture value or the like. In this case, the interval between focusing lens positions increases when the number of combinations is small, and an image focused on the desired subject may not be obtained. Also, when the number of combinations is large, the number of times image capture is performed increases, thus increasing the chances of the subject moving during the image capture period, and making it difficult to obtain a natural-looking combined image. Also, since images that are not be focused on any subject will be captured, efficiency is compromised.

Also, with the image capture apparatus described in Liang, Chia-Kai, et al., the pixel count of the image data that is obtained is much lower than the pixel count of the image sensor, due to a configuration that generates each pixel of the final image from a plurality of pixel values of the captured image. Also, since image generation requires complex computations, there is a slowing of response.

SUMMARY OF THE INVENTION

The present invention has been made in view of such problems with conventional technologies, and provides an image capture apparatus that is capable of efficiently obtaining an image focused on a plurality of subjects at different distances, and a control method thereof.

According to an aspect of the present invention, there is provided an image capture apparatus comprising: a first computation unit configured to derive a frequency distribution of subject distances from a captured image; a selection unit configured to select a plurality of subject distances based on peaks in the frequency distribution; and a control unit configured to acquire a plurality of captured images whose focus distances are the plurality of selected subject distances.

According to another aspect of the present invention, there is provided a method of controlling an image capture apparatus, comprising: first computation step of deriving a frequency distribution of a subject distance from a captured image; selection step of selecting a plurality of subject distances based on a peak in the frequency distribution; and control step of acquiring a plurality of captured images whose focus distances are the plurality of selected subject distances.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First embodiment

First, the configuration and overall processing operations of an image capture apparatus according to a first embodiment of the present invention will be described, with reference to FIGS. 1 to 5B.

Figure 1:
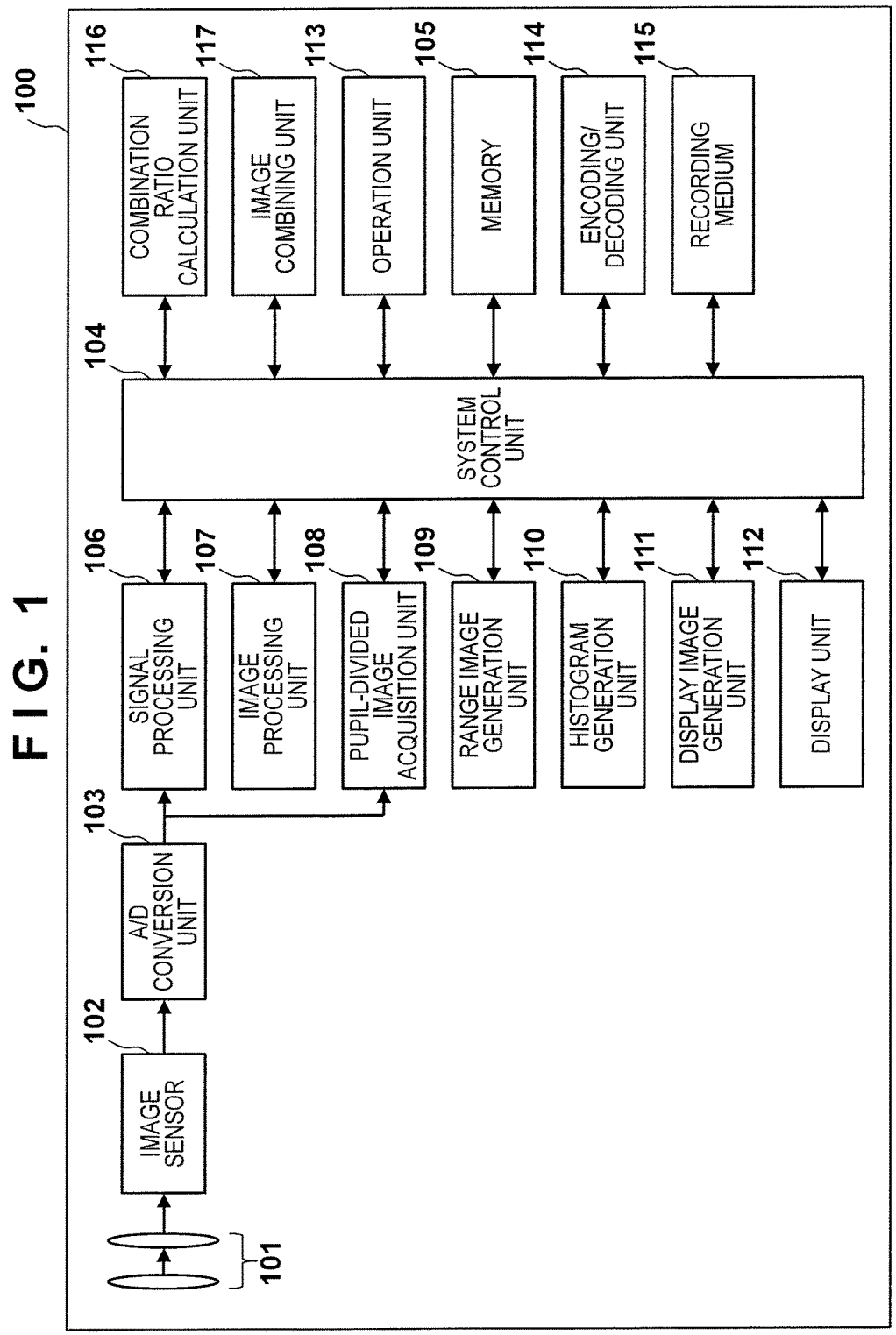
FIG. 1 is a block diagram schematically showing an exemplary functional configuration of a digital camera serving as an example of an image capture apparatus according to an embodiment of the present invention.

FIG. 1 is a block diagram schematically showing an exemplary functional configuration of a digital camera serving as an exemplary image capture apparatus according to the first embodiment of the present invention.

A digital camera 100 may be either a digital still camera or a digital video camera, but is assumed to be a digital still camera in the present embodiment. An image capture optical system 101 is constituted by a group of lenses (hereinafter, "image capture lenses") including a zoom lens and a focusing lens, and an aperture.

An image sensor 102 is a CCD image sensor or a CMOS image sensor, for example. The image sensor 102 generates image signals (electrical signals) by photoelectrically converting a subject image formed by the image capture lenses of the image capture optical system 101 with a plurality of pixels arranged two-dimensionally, and outputs the generated image signals. Color filters in a Bayer array are provided in the image sensor 102, and image signals in a Bayer array are generated from the output of the pixels. As will be discussed later in detail, the image sensor 102 of the present embodiment has a plurality of photoelectric conversion areas per pixel, and outputs pupil-divided image signals.

An A/D conversion unit 103 converts the image signals output by the image sensor 102 from analog signals to digital signals, and outputs the resultant signals to a signal processing unit 106 and a pupil-divided image acquisition unit 108.

A system control unit 104 is a programmable processor such as CPU, for example, and controls the overall operations of the digital camera 100 by executing programs stored in a nonvolatile storage device.

A memory 105 is used as a temporary storage area for processing performed by the system control unit 104 and the like, an area for loading programs, and the like. The memory 105 may have a nonvolatile area for storing various settings, programs, and the like.

The signal processing unit 106 performs predetermined signal processing on the image signals in a Bayer array converted to digital signals by the A/D conversion unit 103.

An image processing unit 107 performs image processing such as color interpolation and white balance adjustment on the image signals that are output by the signal processing unit 106.

The pupil-divided image acquisition unit 108 generates stereoscopic images having horizontal parallax from the image signals converted to digital signals by the A/D conversion unit 103.

A range image generation unit 109 generates a range image by computing the subject distance for each pixel from the stereoscopic images generated by the pupil-divided image acquisition unit 108. An exemplary range image will be illustrated later. A phase difference detection method can be used as the method of computing the subject distance.

Here, the configuration of the image sensor 102 and an exemplary computation of the subject distance of each pixel will be described, with reference to FIGS. 2A to 2B and FIG. 3.

Figure 2A:
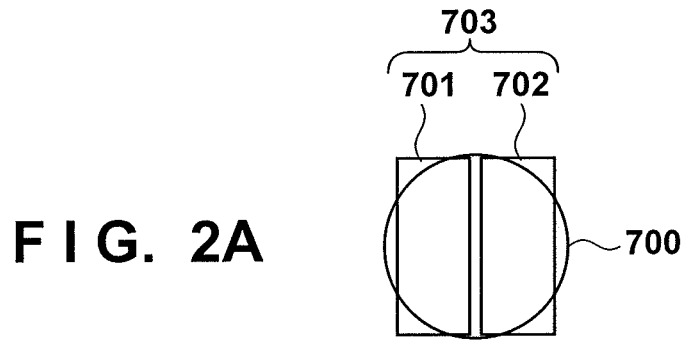
FIGS. 2A and 2B are diagrams schematically showing an exemplary configuration of pixels of an image sensor with which the digital camera according to the embodiment is provided.
Figure 2B:
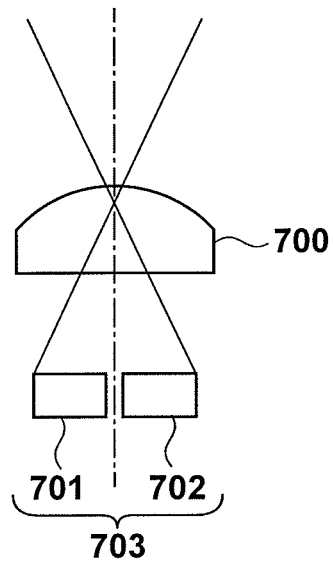

FIGS. 2A and 2B are diagrams schematically showing an exemplary configuration of the pixels arranged in the image sensor 102, with FIG. 2A being a plan view and FIG. 2B being a vertical cross-sectional view. One pixel 703 corresponds to one microlens 700, and has a right and a left, that is, two photoelectric conversion areas 701 and 702. Such a configuration results in the photoelectric conversion areas 701 and 702 receiving luminous flux that is emitted from different areas of an exit pupil of the image capture lenses. Hereinafter, the left and right photoelectric conversion areas 701 and 702 will be distinguished by calling one A pixel and the other B pixel for convenience of description.

Also, the image that is formed by A pixels (image that is formed by collecting only the output signals of A pixels) will be called an A image, and the image that is formed by B pixels will be called a B image. Note that, in the case of generating a normal image, the signals that are obtained by the two photoelectric conversion areas in one pixel are added together to form a signal in pixel units. The A image and the B image form one pair of stereoscopic images having parallax (phase difference). The image sensor 102 included in the digital camera 100 of the present embodiment is thus an image sensor that is capable of outputting a pair of stereoscopic images.

Figure 3:
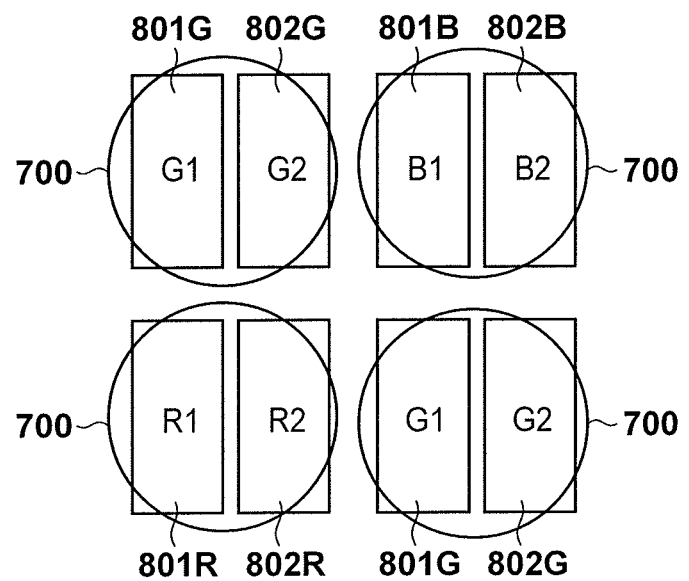
FIG. 3 is a diagram schematically showing the arrangement relationship between pixels and color filters of the image sensor according to the embodiment.

FIG. 3 is a plan view schematically showing the arrangement relationship between pixels and color filters in the image sensor 102. Note that FIG. 3 shows a portion consisting of two vertical pixels and two horizontal pixels extracted from among the pixels of the image sensor 102.

Two color filters of the same color are provided in correspondence to the two photoelectric conversion areas in each pixel of the image sensor 102. In FIG. 3, R (red) color filters 801R and 802R are provided for the lower left pixel, G (green) color filters 801G and 802G are provided for the upper left and the lower right pixels, and B (blue) color filters 801B and 802B are provided for the upper right pixel. The color filters 801R, 801G and 801B are provided in correspondence to the photoelectric conversion area 701, and the color filters 802R, 802G and 802B are provided in correspondence to the photoelectric conversion area 702. In this way, R pixels, B pixels and G pixels are typically arranged in a Bayer array in the image sensor 102.

Figure 4:
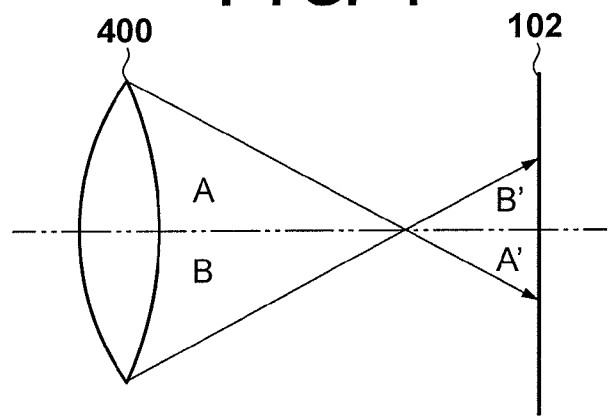
FIG. 4 is a diagram schematically showing the relationship between the image sensor according to the embodiment and a lens included in an image capture optical system.

Here, an outline of a method of computing the subject distance using image signals that are obtained by the image sensor 102 having a pupil division function will be described, with reference to FIG. 4. FIG. 4 is a diagram schematically showing the relationship between the image sensor 102 and a lens 400 that is included in the image capture optical system 101. As shown in FIG. 4, the digital camera 100 receives two luminous fluxes that have passed through two mutually different exit pupil regions (here, upper area A and lower area B) of the lens 400 that is included in the image capture optical system 101 with the image sensor 102. Here, when the image formed by the lens 400 exists in front of (i.e., on the lens 400 side of) the light receiving surface of the image sensor 102, the luminous flux passing through the upper area A of the exit pupil in FIG. 4 shifts to the lower side on the light receiving surface of the image sensor 102, as shown by A'. On the other hand, the luminous flux that passes through the lower area B of the exit pupil in FIG. 4 shifts to the upper side, as shown by B'.

The image sensor 102 outputs image signals for the A image and image signals for the B image, by receiving luminous flux that has passed through one of the exit pupils with one of the two photoelectric conversion areas and receiving luminous flux that has passed through the other exit pupil with the other photoelectric conversion area. The range image generation unit 109 computes the amount of shift (i.e., amount of relative positional shift between the luminous fluxes in the division direction) between the stereoscopic images (A image and B image) generated by the pupil-divided image acquisition unit 108. The range image generation unit 109 then computes the distance between the digital camera 100 and the subject, using the computed defocusing amount and the individual pieces of lens information and aperture information.

Figure 5A:
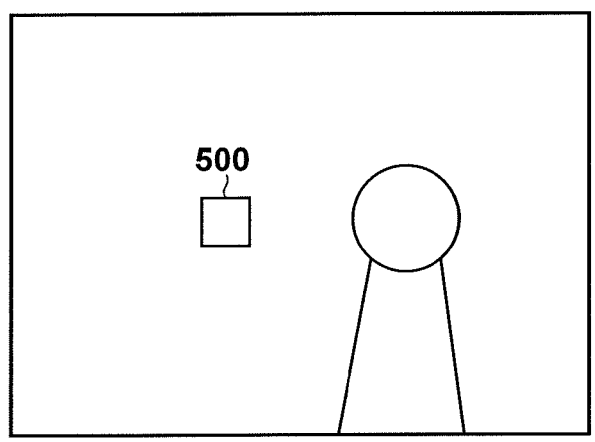
FIGS. 5A and 5B are diagrams illustrating a method of computing the amount of shift of a subject image based on stereoscopic images in a digital camera according to the embodiment.
Figure 5B:
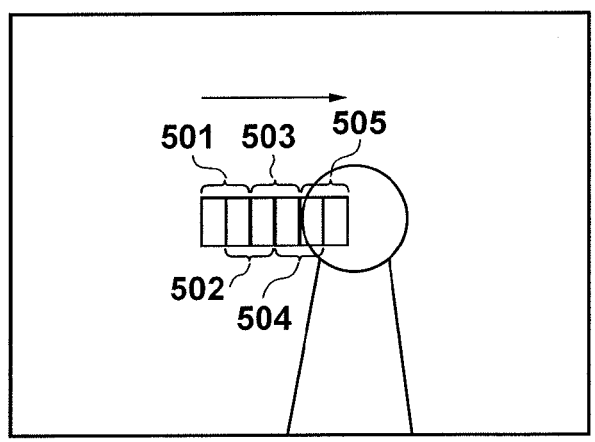

Here, a method of computing the amount of shift (phase difference) of the subject image based on a pair of stereoscopic images having parallax (different phases) will be described. FIG. 5A shows a standard image and FIG. 5B shows a reference image. The range image generation unit 109 computes an evaluation value of the correlation between a correlation calculation area 500 of the standard image and correlation calculation areas 501 to 505 of the reference image, while shifting the correlation calculation areas 501 to 505 of the reference image sequentially.

Specifically, first, the range image generation unit 109 derives, for each pixel within the correlation calculation area 500 of the standard image, the difference in luminosity value from a pixel that exists in the same position of the correlation calculation areas 501 to 505 of the reference image, and obtains a sum for each correlation calculation area. These values serve as correlation evaluation values. If there is a correlation calculation area of the reference image whose image matches the correlation calculation area 500 of the standard image, the correlation evaluation value for that area will be 0. Accordingly, the pixel at the shift count at which the correlation evaluation value is minimized will be the corresponding point in the reference image. The subject is at the focus distance if the correlation evaluation value is minimized at a shift amount of 0, with the direction of shift at which the correlation value is minimized being either to the near side or the far side of the focus distance in other cases, and the amount of shift indicating the distance from the focus distance to the subject.

Figure 7:
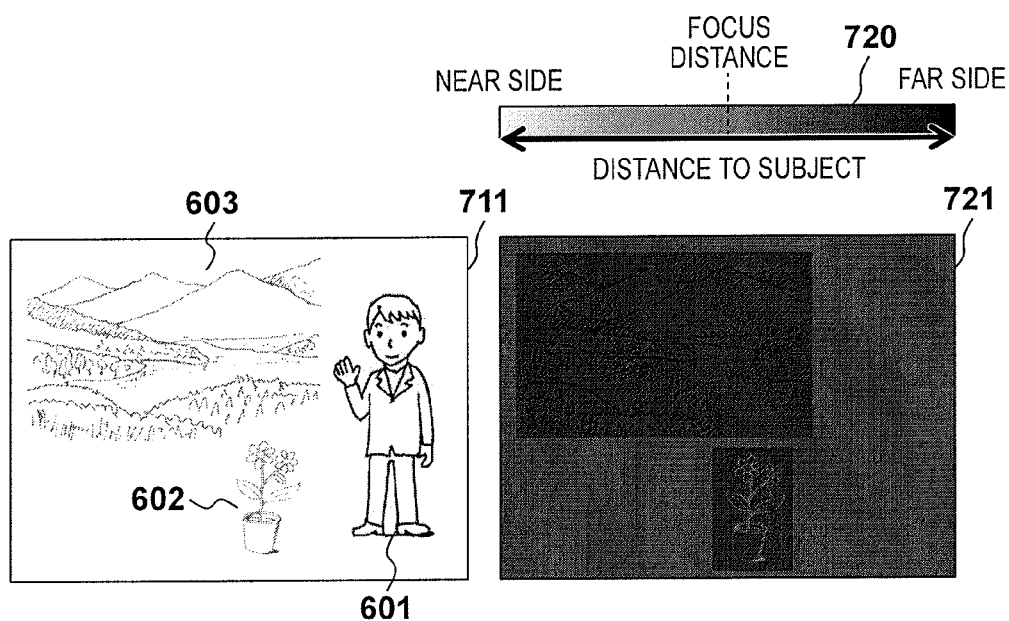
FIG. 7 is a diagram showing examples of a captured image and a range image acquired during electronic viewfinder display operation in order to determine the focus distance in the digital camera according to the embodiment.

The range image generation unit 109 generates a range image that is constituted by pixel values that depend on the distance to the subject, by performing the correlation calculation while shifting the correlation calculation area of the standard image one pixel at a time. An exemplary range image that is generated is shown in FIG. 7 discussed later.

Returning to FIG. 1, a histogram generation unit 110 generates a distance histogram indicating the frequency of appearance of pixels for each distance from the range image that is output by the range image generation unit 109.

A display image generation unit 111 generates a display image in which information such as aperture value, ISO speed and the histogram generated by the histogram generation unit 110 are superimposed on a captured image. Note that captured images are images that are generated by the image sensor 102, and that have undergone predetermined signal processing and image processing by the A/D conversion unit 103, the signal processing unit 106, and the image processing unit 107.

A display unit 112 has an image display device such as a TFT liquid crystal display panel. The display unit 112 displays the display image generated by the display image generation unit 111 via a D/A conversion unit (not shown).

Note that the display image generation unit 111 processes captured images in real time, and the display unit 112 is able to display the display image generated by the display image generation unit 111 in real time. The display unit 112 is thereby able to realize an electronic viewfinder (EVF) function.

An operation unit 113 has an input device such as a touch display panel that is integrated with the display unit 112. Shifting from electronic viewfinder display operation to still image capture operation and execution of operations such as playback of still images stored on a recording medium and adjustment of the depth of field after image capture by combination processing are instructed to the system control unit 104 by user operation of the operation unit 113.

An encoding/decoding unit 114 encodes captured images obtained by still image capture and corresponding range images. Also, the encoding/decoding unit 114 decodes encoded image data read out from a recording medium 115 at the time of still image playback, and also encodes combined images obtained by the combination processing. This processing will be discussed in detailed later.

The recording medium 115, which is a removable semiconductor memory card, for example, is controlled by a recording medium controller (not shown) and stores image data encoded at the time of still image capture or combination processing.

A combination ratio calculation unit 116 computes the combination ratio of captured images to be combined at the time of combination processing, according to the focus distances of the captured images to be combined and the pixel values of the range images. Also, in an embodiment that designates the range of the depth of field, a combination ratio that depends on the designated depth of field is computed.

An image combining unit 117 generates a combined image by combining a plurality of captured images, on the basis of the combination ratio computed by the combination ratio calculation unit 116 at the time of combination processing and the pixel values of the range images corresponding to the captured images that are combined.

Next, a method of determining the focus distance in order for the digital camera 100 of the present embodiment to capture a plurality of captured images for use in adjusting the depth of field after image capture will be described, with reference to FIGS. 6 to 8.

Figure 6:
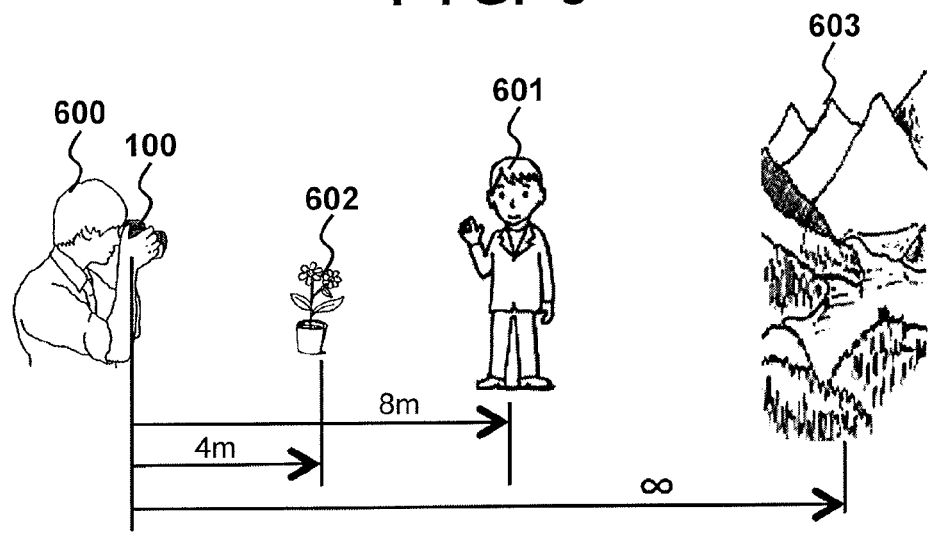
FIG. 6 is a diagram showing exemplary distances of the digital camera according to the embodiment from subjects at the time of image capture.

FIG. 6 is a diagram showing the digital camera 100 at the time of image capture and distances to exemplary subjects 601 to 603. A person 601 is at a distance of 8 m from the image sensor 102 (image capture surface) of the digital camera 100 that is being held by a photographer 600, flowers 602 are at a distance of 4 m, and a background 603 is at a distance that is regarded as infinity by the image capture optical system 101.

FIG. 7 shows examples of a captured image and a range image acquired during electronic viewfinder display operation in order to determine the focus distance.

Reference numerals 711 and 721 denote a captured image at a focus distance of 8 m and a corresponding range image. In the captured image 711, the person 601 located at the focus distance is in focus, and the flowers 602 on the near side and the background 603 on the far side are blurred. A corresponding range image 721 shows the distance to the subjects per pixel. A rectangle 720 indicates the relationship between pixel values (e.g., luminance values) and distances to subjects, taking the focus distance as the median value, with subjects on the near side being represented brighter and subjects on the far side being represented darker. Thus, in the range image 721, the flowers on the near side are bright and the background on the far side is darker.

Figure 8:
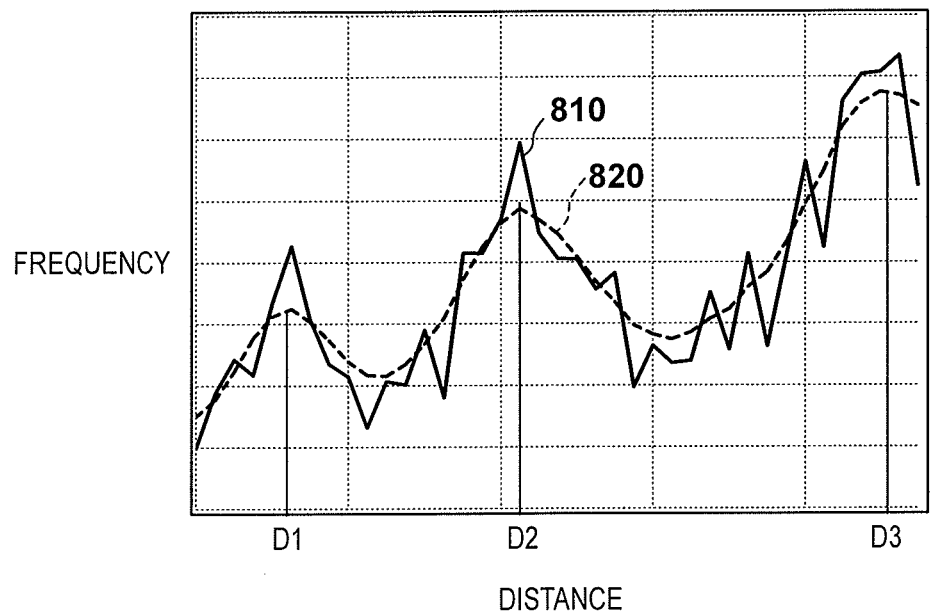
FIG. 8 is a diagram showing an exemplary distance histogram that is obtained with the digital camera according to the embodiment.

FIG. 8 shows a distance histogram obtained by the histogram generation unit 110 from the range image 721. Reference numeral 810 denotes the frequency of appearance of distance and reference numeral 820 denotes the frequency of appearance 810 after having been smoothed with a smoothing filter. The system control unit 104 determines distances D1, D2, and D3 corresponding to peaks in the frequency of appearance from this histogram as the focus distances at the time of capturing images for use in generating a combined image. Here, the distance D1 corresponds to 4 m (flowers), D2 corresponds to 8 m (person), and D3 corresponds to infinity (background). Note that smoothing is not essential, and focus distances may be directly determined from the frequency distribution.

In the digital camera 100 of the present embodiment, priorities are assigned from near side to far side, and images are captured with the focus distance changed in the order of D1, D2, D3. Images are captured starting from the shortest focus distance in order to suppress the shutter time lag of subjects captured first. Since subjects that are at a short distance have a shallow depth of field, exert a greater influence when they move, and are more likely to be important to the photographer, it is considered best to first perform image capture focused on close subjects. This suppresses the influence that the difference in image capture timing exerts on image combining when adjusting depth of field after image capture.

Note that although three focus distances are selected in the example given here, two or more focus distances is sufficient for use in adjusting the depth of field after image capture, with the degree of freedom with which the depth of field is adjusted after image capture increasing the greater the number of focus distances. On the other hand, the time lag at the time of image capture increases when there are more focus distances. The number of focus distances may be set in advance by the user via the operation unit 113. Alternatively, the number of focus distances may be automatically increased or decreased by the system control unit 104 based on the number of peaks detected from the distance histogram. Also, in the case where a peak in the distance histogram slopes gently, the number of focus distances may be increased by marking the area around the peak so as to enable the focus distance to be finely adjusted. Also, in portions where there is no peak, focus distances to be captured may be marked at intervals that depend on the height of the histogram. Also, it is favorable to increase the number of focus distances because the time lag during image capture and consequently the influence on image combining is reduced if the time taken to capture one frame is short, due to factors such as the exposure conditions and the drive speed of the image capture optical system 101. It is also favorable to increase the number of focus distances since focus accuracy is required if the resolution of the image to be recorded is high.

Next, processing by which the digital camera 100 of the present embodiment captures/records images whose depth of field can be adjusted afterwards will be described with reference to the flowchart of FIG. 9. The digital camera 100 of the present embodiment performs this capturing/recording of images after start-up or due to a user instruction through the operation unit 113.

In S901, the electronic viewfinder display operation is performed. In the electronic viewfinder display operation, generation and display of display images is performed using predetermined signal processing and image processing by continuous image capture performed under the control of the system control unit 104, the signal processing unit 106, and the image processing unit 107. Also, generation of range images is performed by the range image generation unit 109.

At S902, the system control unit 104 judges whether still image capture has been instructed by the user through the operation unit 113. If not instructed, the system control unit 104, at S903, determines whether it has been instructed to end image capture, and ends the processing if instructed. If it has not been instructed to end image capture, the system control unit 104 returns the processing to S901.

On the other hand, if still image capture has been instructed at S902, the system control unit 104, at S904, uses the histogram generation unit 110 to acquire a distance histogram from the range images acquired during the previous electronic viewfinder display operation. The system control unit 104 then selects and lists a plurality of focus distances to undergo image capture, on the basis of the distance histogram, and assigns priorities.

At S905, the system control unit 104 performs image capture with the image capture optical system 101 focused on the focus distance with the highest priority, among the plurality of focus distances included in the focus distance list, and deletes the focus distance that has undergone image capture from the list. The captured image is stored in the memory 105 by the system control unit 104 after undergoing predetermined signal processing and image processing by the signal processing unit 106 and the image processing unit 107, and being encoded by the encoding/decoding unit 114.

At S906, the system control unit 104 determines whether any elements remain in the focus distance list, and executes the processing from S905 again if any elements remain.

On the other hand, if no elements remain in the focus distance list, the system control unit 104, at S907, groups and records the plurality of captured images on the recording medium 115 as one file, for example, and returns the processing to S901.

Figure 9:
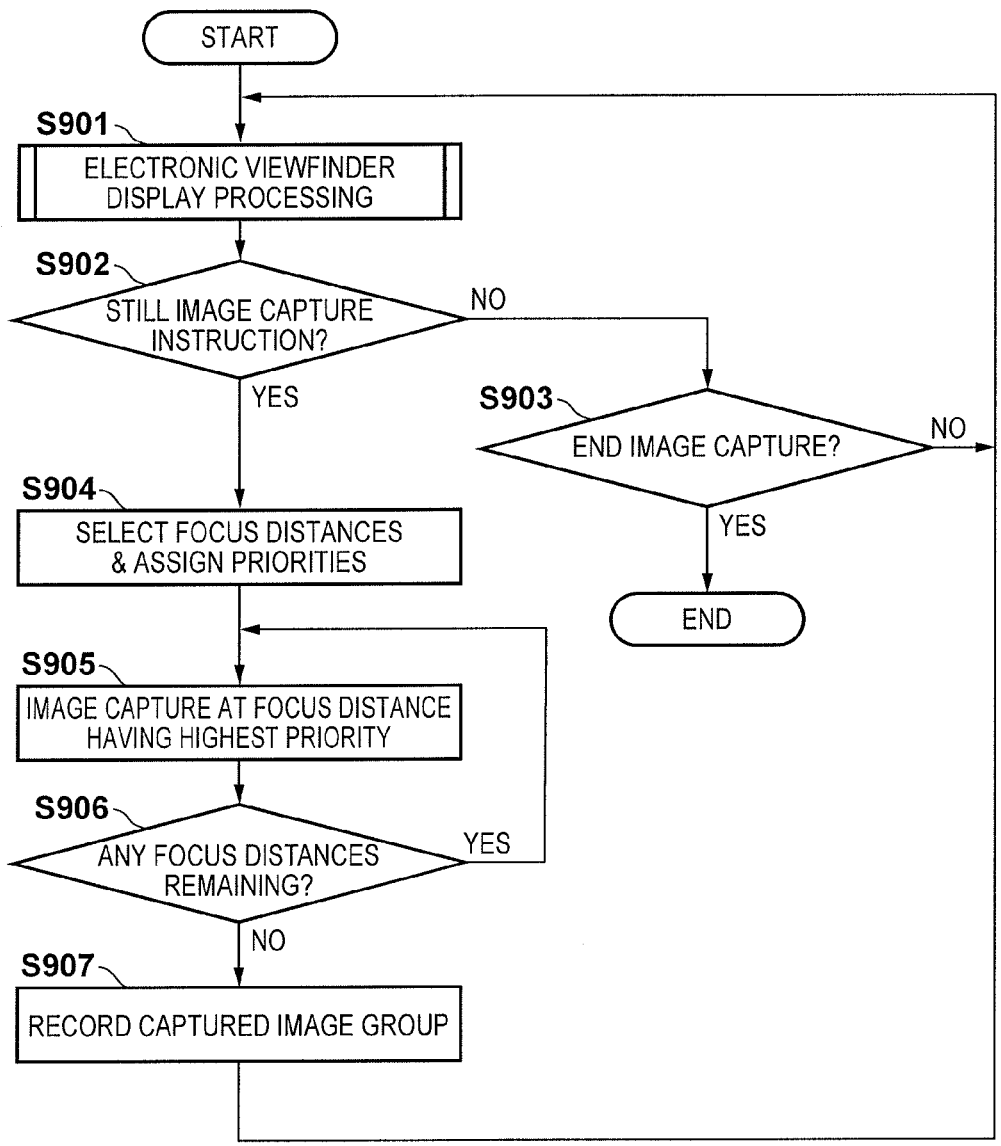
FIG. 9 is a flowchart for illustrating image capture/recording operations of the digital camera according to the embodiment.
Figure 10:
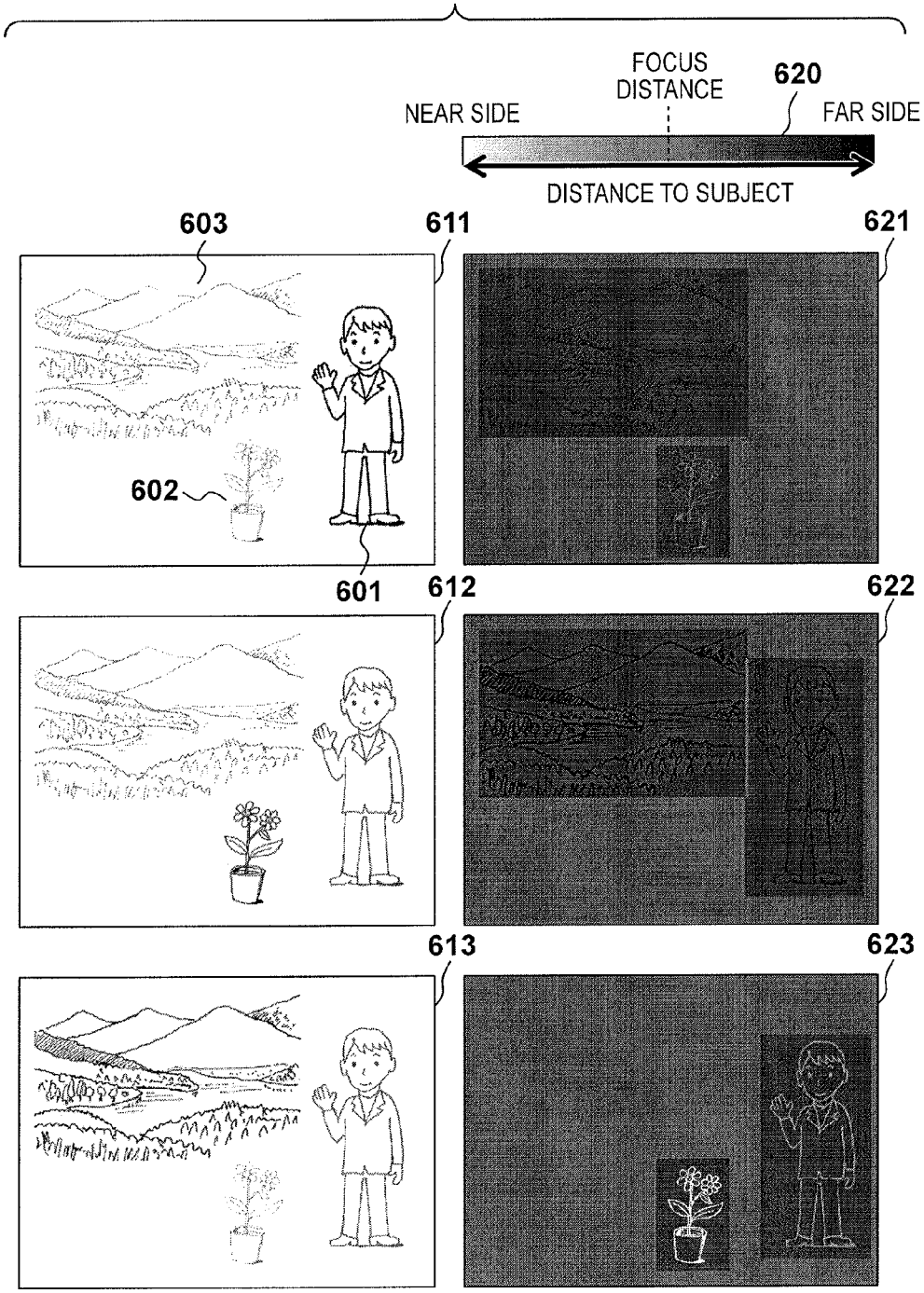
FIG. 10 is a diagram showing examples of a plurality of captured images and range images captured with different focus distances by the digital camera according to the embodiment.

FIG. 10 is a diagram schematically showing an example of a plurality of images captured at a plurality of focus distances and corresponding range images in accordance with the flowchart of FIG. 9.

Reference numerals 611 and 621 are, like the captured image 711 and range image 721 shown FIG. 7, a captured image at a focus distance of 8 m and a range image. In the captured image 611, the person 601 located at the focus distance is in focus, and the flowers 602 on the near side and the background 603 on the far side are blurred. The corresponding range image 621 shows the distance to the subjects with pixel values. A rectangle 620, like the rectangle 720 shown in FIG. 7, indicates the relationship between the distance to the subjects and the pixel values of the range image, with subjects on the near side being represented brighter and subjects on the far side being represented darker. Accordingly, in the range image 621, the flowers on the near side of the person 601 are bright and the background on the far side is darker.

Similarly, reference numerals 612 and 622 denote a captured image at a focus distance of 4 m and a range image. In the captured image 612, the flowers are in focus, and the person on the far side and the background further on the far side are blurred. In the range image 622, the person is dark and the background is still darker.

Also, reference numerals 613 and 623 denote a captured image at a focus distance of infinity and a range image. In the captured image 613, the background is in focus, and the person on the near side and the flowers further on the near side are blurred. In the range image 623, the person is bright and the flowers are still brighter.

Next, the form in which the plurality of captured images captured by the digital camera 100 of the present embodiment in order to generate a combined image and the corresponding range images are recorded on the recording medium 115 will be described, with reference to FIG. 11.

Figure 11:
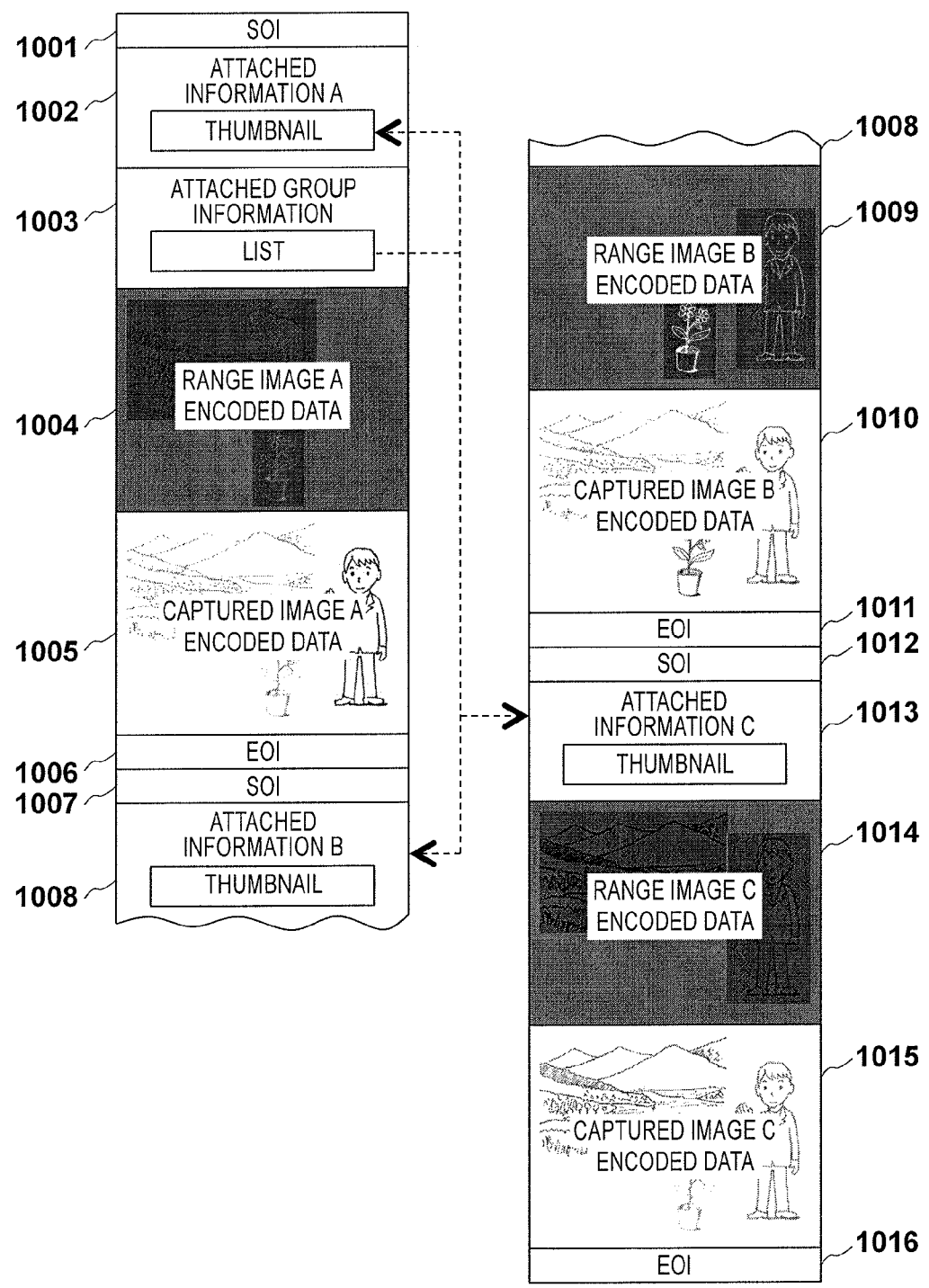
FIG. 11 is a diagram showing an exemplary structure of an image file that is recorded by the digital camera according to the embodiment.

FIG. 11 is a diagram showing an exemplary structure of an image file in which encoded data of the captured images 611, 612 and 613 and the range images 621, 622 and 623 are grouped as one file.

Image data corresponding to one focus distance is stored in the area between a SOI (Start Of Image) marker 1001 and an EOI (End Of Image) marker 1006 that appears next. Note that, here, a captured image and a corresponding range image are handled together as the image data of one frame.

A thumbnail image and information including image capture conditions such as focus distance and the like when the captured image 611 was captured are stored in attached information 1002 of the captured image 611.

Group information 1003 is information showing the configuration of all frame images included in this image file, with the number of stored frames, the position (offset position) of each frame image within the file, an identifier and the like being stored. The group information 1003 is only included in the image data of the first frame.

Encoded image data 1004 and 1005 are the encoded data of the range image 621 and the captured image 611.

Image data of the second frame is stored in the area between an SOI marker 1007 and an EOI marker 1011.

A thumbnail image and image capture conditions such as focus distance and the like when the captured image 612 was captured are stored in attached information 1008 of the captured image 612.

Encoded image data 1009 and 1010 are the encoded data of the range image 622 and the captured image 612.

Image data of the third frame is stored in the area between an SOI marker 1012 and an EOI marker 1016.

A thumbnail image and image capture conditions such as focus distance and the like when the captured image 613 was captured are stored in attached information 1013 of the captured image 613.

Encoded image data 1014 and 1015 are the encoded data of the range image 623 and the captured image 613.

Next, a method of computing the combination ratio at the time of the digital camera 100 of the present embodiment generating a combined image from the images of one group that was captured with different focus distances and a method of generating a combined image will be described, with reference to FIGS. 12A and 12B and FIG. 13.

Figure 12A:
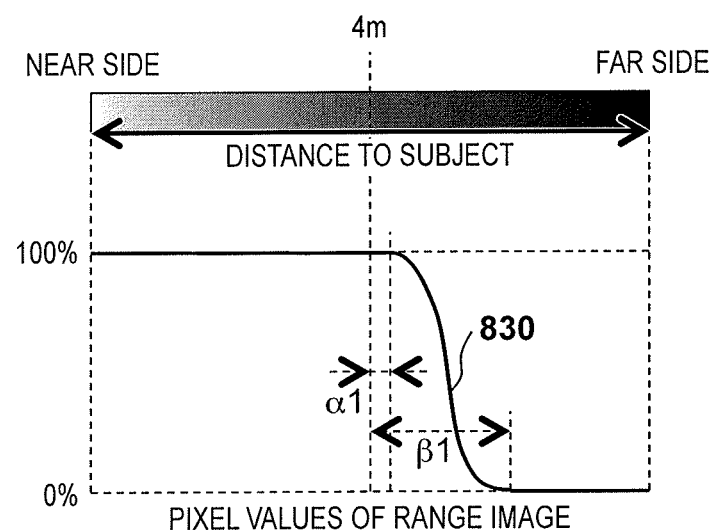
FIGS. 12A and 12B are diagrams showing exemplary combination ratios computed by a combination ratio calculation unit in the embodiment.
Figure 12B:
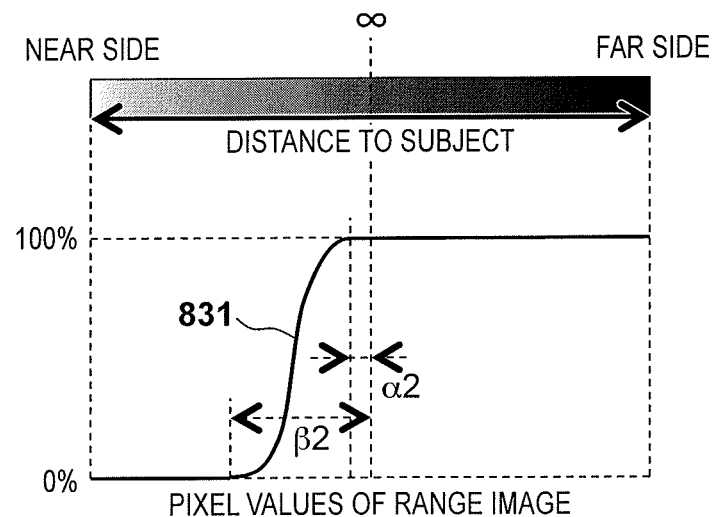

FIGS. 12A and 12B are diagrams showing exemplary combination ratios computed by the combination ratio calculation unit 116, in the case of combining a plurality of captured images having different focus distances in order to expand the depth of field.

A combination ratio curve 830 in FIG. 12A shows an exemplary combination ratio of the captured image 612 (focus distance of 4 m) relative to the captured image 611 (focus distance of 8 m) at the time of expanding the depth of field to a range from the vicinity of 4 m to the vicinity of 8 m. The combination ratio changes according to the pixel values of the range image 622 corresponding to the captured image 612 to be combined, that is, according to the subject distance per pixel.

In this example, with regard to subject distances less than or equal to $(4+\alpha 1)$ m, the combination ratio of the captured image 612 is set to 100%, and the pixels of the captured image 612 are used directly as combined pixels. With regard to subject distances from $(4+\alpha 1)$ m to $(4+\beta 1)$ m (where $\alpha 1 < \beta 1$), the pixels of the captured image 611 and the pixels of the captured image 612 are combined at a higher ratio of the captured image 611 as the distance increases. With distances greater than or equal to $(4+\beta 1)$ m, the combination ratio of the captured image 611 is set to 100%, and the pixels of the captured image 611 are used directly as combined pixels.

In this way, only the captured image 612 is used in areas in which subjects appear further on the near side than the vicinity of 4 m, and only the captured image 611 is used in areas in which subjects appear further on the far side of $(4+\beta 1)$ m. Also, the captured images 612 and 611 are combined for subject distances from $(4+\alpha 1)$ m to $(4+\beta 1)$ m. The values of $\alpha 1$ and $\beta 1$ can be set in advance according to conditions such as the depth of field and the interval between the focus distances of the two images.

A combination ratio curve 831 shows an exemplary combination ratio of the captured image 613 for the combined image at the time of combining the captured image 613 with the combined image of the captured images 611 and 612 to further expand the depth of field to a range in the vicinity of infinity. The combination ratio curve 831 changes relative to the pixel values of the range image 623 corresponding to the captured image 613 at a focus distance of infinity, that is, according to the distance to the subject per pixel.

In this example, the combination ratio of the captured image 613 is set to 100% for distances greater than or equal to $(\text{infinity}-\alpha 2)$, and the pixels of the captured image 613 are used directly as combined pixels. Also, for distances from $(\text{infinity}-\alpha 2)$ to $(\text{infinity}-\beta 2)$ (where $\alpha 2 < \beta 2$), the combination ratio of the captured image 613 is reduced (ratio of combined image is increased) the shorter the distance. With distances less than or equal to $(\text{infinity}-\beta 2)$, the combination ratio is set to 0%, and the pixels of the combined image are used directly as combined pixels. In this way, the combined image is directly used in areas in which subjects appear further on the near side than $(\text{infinity}-\beta 2)$, and the captured image 613 is directly used in areas in which subjects appear at a distance greater than or equal to $(\text{infinity}-\alpha 2)$. Also, with regard to subject distances from $(\text{infinity}-\beta 2)$ to $(\text{infinity}-\alpha 2)$, pixels combined with the combination ratio of the captured image 613 increased as the distance increases are used as combined pixels. The values of $\alpha 2$ and $\beta 2$ can be preset according to conditions such as the depth of field and the interval between the focus distances of the two images.

In the example shown here, the combination ratio calculation unit 116 uses the range image 622 in combining the captured image 611 and the captured image 612, and uses the range image 623 in combining the combined image of the captured images 611 and 612 and the captured image 613. The combination ratio calculation unit 116, in the case where the difference in depth of field between two images to be combined is greater than or equal to a predetermined value, uses the range image corresponding to the captured image having the shallower depth of field. This is because the accuracy of the distance to the subject improves, since the defocusing amount of the subject that is distant from the focus distance is greater for the image with the shallower depth of field. Also, in the case of combining three or more images, the captured images serving as standard captured images are combined in order from the captured image having the shortest focus distance. Expansion of the depth of field through combination of three or more images can thereby be realized, by repeatedly computing the combination ratio for two images and combining the two images as described above.

Note that, in the present embodiment, since a combined image obtained by combining two or more captured images has a deeper depth of field than another single captured image, the range image corresponding to the captured image is used in combining the combined image and the captured image. In the case of combining a captured image having a greater depth of field than a two-image combined image, a range image corresponding to the combined image may be generated and used in combining the combined image and the captured image. This range image can be generated from the range images of the captured images used in the combined image. Specifically, pixels (corresponding to the subject further away than the focus distance) having a larger pixel value than the median value are extracted from the range image of the captured image having the longer focus distance. Also, pixels (corresponding to the subject closer than the focus distance) having a smaller pixel value than the median value are extracted from the range image of the captured image having the shorter focus distance. The range image can then be generated by setting the remaining pixels to the median value.

Figure 13:
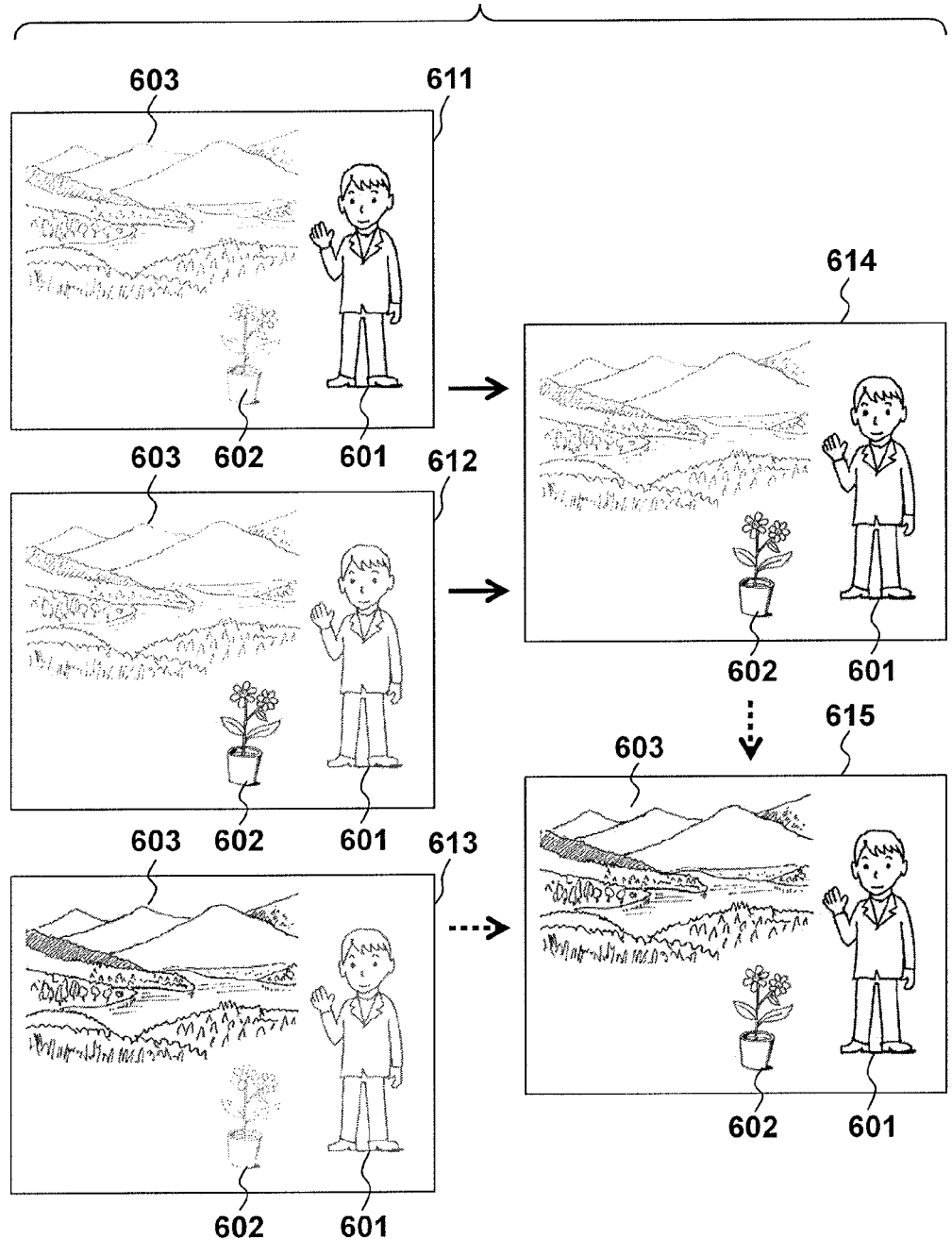
FIG. 13 is a diagram schematically showing a result of expanding the depth of field by combining captured images in the digital camera according to the embodiment.

FIG. 13 is a diagram schematically showing the result of expanding the depth of field by combining captured images.

In the case of expanding the depth of field to a range from the vicinity of 4 m to the vicinity of 8 m, a combined image 614 is output by combining the captured image 612 with the captured image 611. This combination processing is performed based on the combination ratio computed by the combination ratio calculation unit 116 and the pixel values of the range image 622 corresponding to the captured image 612. In the combined image 614, both the person 601 in the vicinity of 8 m and the flowers 602 in the vicinity of 4 m are in focus, but the background at infinity is not in focus.

Furthermore, in the case of expanding the depth of field to a range in the vicinity of infinity, a combined image 615 is output by combining the captured image 613 with the combined image 614. This combination processing is performed based on the combination ratio computed by the combination ratio calculation unit 116 and the pixel values of the range image 623 corresponding to the captured image 613. In the combined image 615, the background 603 is also in focus, in addition to the person 601 and the flowers 602.

As described above, according to the present embodiment, the focus distance at the time of capturing a plurality of images for generating a combined image having an expanded depth of field is determined based on peaks in the frequency distribution of subject distances. Thus, a combined image in which the main subjects within the scene are in focus can be efficiently obtained. Also, as a result, the focus accuracy, that is, image quality, of the main subjects in a combined image can also be improved.

Also, the frequency distribution of subject distances can be readily derived, by using a range image generated from a pair of images having parallax. In particular, there are significant advantages for an image capture apparatus having an image sensor capable of focus detection using an image capture surface phase difference detection method, since a special configuration for generating range images is not required.

Second embodiment

Next, a second embodiment will be described. The present embodiment differs from the first embodiment in that a subject of interest is detected from a captured image, and priority is given to the focus distance of the subject of interest when capturing a plurality of images. Hereinafter, the present embodiment will be described focusing on the differences from the first embodiment.

In a digital camera of the present embodiment, the image processing unit 107 has a function of detecting a subject of interest. This detection function may be a function for detecting an image pattern such as a person or a face from a captured image that has undergone signal processing and image processing, or may be a function for detecting an area in which there is large amount of movement or change through comparison with captured images that were captured at different times. Note that a functional block for detecting a subject of interest may be provided separately to the image processing unit 107.

In the present embodiment, the image processing unit 107 applies the function of detecting a subject of interest to captured images in the electronic viewfinder display operation of S901. In the case where the area of a subject of interest is detected, the system control unit 104 then detects the amount of shift in focus with respect to the subject of interest, from the area of the range image corresponding to the detected area of the subject of interest. The system control unit 104 then controls the focus distance of the image capture optical system 101, so as to focus on the area of the subject of interest. An image focused on the subject of interest is thereby displayed on the electronic viewfinder.

When a still image capture instruction is detected at S902, the system control unit 104 then determines the focus distance to be captured, similarly to the first embodiment. In the first embodiment, the focus distance is determined from subject distances corresponding to peaks in the frequency distribution, whereas in the present embodiment, the focus distance to a subject of interest is included, and the highest priority is assigned to the focus distance to the subject of interest. Accordingly, the focus distance to the area of the subject of interest may be determined as the focus distance to be captured, irrespective of the frequency distribution in the range images.

In other words, at S904, the system control unit 104 selects a plurality of focus distances determined based on the peaks of the distance histogram and the focus distance to the subject of interest, and assigns priorities in order from the focus distance to the subject of interest. Note that, in the case where a plurality of subjects of interest are detected, one or more conditions relating to position, size or the like may be taken into consideration in assigning priorities, such that priorities are assigned from the shortest distance, the largest area, the subject of interest closest to the center of the image, or the like.

Since the subject of interest is likely to be important to the photographer, the chances of being able to obtain a more desirable combined image can be enhanced, by suppressing the shutter time lag with respect to the subject of interest through assigning priorities in such a manner. Also, since there is a high possibility of image capture being performed in a state where the image capture optical system 101 is focused on the subject of interest during electronic viewfinder display operation, the time taken to move the focusing lens can be suppressed at the time of the initial image capture in response to a still image capture instruction.

Note that the effect of suppressing shutter lag at the time of the initial still image capture can be realized even if priorities are assigned so that image capture is executed from the focus distance that is closest to the current focus position. Assignment of priorities in this way can be implemented independently of the present embodiment.

Also, the function of automatically detecting the area of a subject of interest is not essential, and an area obtained by allowing the user to designate an area of the electronic viewfinder display screen may be set as the area of the subject of interest, instead of automatically detecting an area.

Third embodiment

Next, a third embodiment will be described. The present embodiment differs from the second embodiment in that a distance histogram is generated after having detected a subject of interest from captured images and weighted the area of the detected subject of interest. Hereinafter, description will be given focusing on the differences from the second embodiment.

The method of determining the focus distance at the time of capturing a plurality of images for generating a combined image having an expanded depth of field according to the present embodiment will be described, with reference to FIGS. 14 to 15B.

Figure 14:
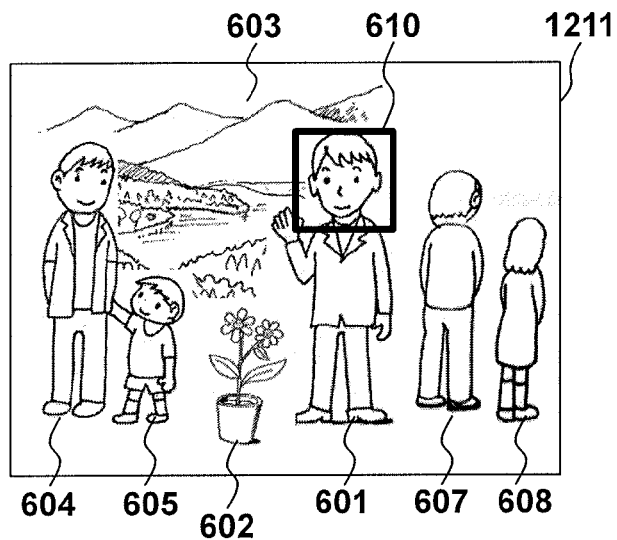
FIG. 14 is a diagram showing an exemplary captured image that was captured by a digital camera according to a third embodiment during electronic viewfinder display operation.

FIG. 14 shows an exemplary captured image that was captured during electronic viewfinder display operation.

A captured image 1211 is captured at a focus distance of 8 m, and, in contrast to the captured image 711 at a focus distance of 8 m in the first embodiment shown in FIG. 7, there are other persons 604, 605, 607 and 608 around the person 601. These persons 604, 605, 607 and 608 are assumed to be a slightly further away than the person 601. The person 601 located at the focus distance is in focus and the flowers 602 on the near side and the background 603 on the far side are blurred, as in the captured image 711 of FIG. 7. In the captured image 1211 of the present embodiment, the person 601 is treated as the subject of interest, and a difference from the first embodiment is that a frame 610 indicating the subject of interest is displayed on the display screen.

In order to extract a person who is important to the photographer from among the plurality of persons, in the digital camera of the present embodiment, the image processing unit 107 has a subject identification function, in addition to the function of detecting a subject of interest. In the present embodiment, a subject identification unit that provides the subject identification function may also be provided separately to the image processing unit 107. The subject identification function identifies an individual by extracting a feature amount of an image pattern from the area of the detected subject of interest, and comparing the extracted feature amount with the feature amounts of persons collected in advance and stored in a recording medium or the like.

Figure 15A:
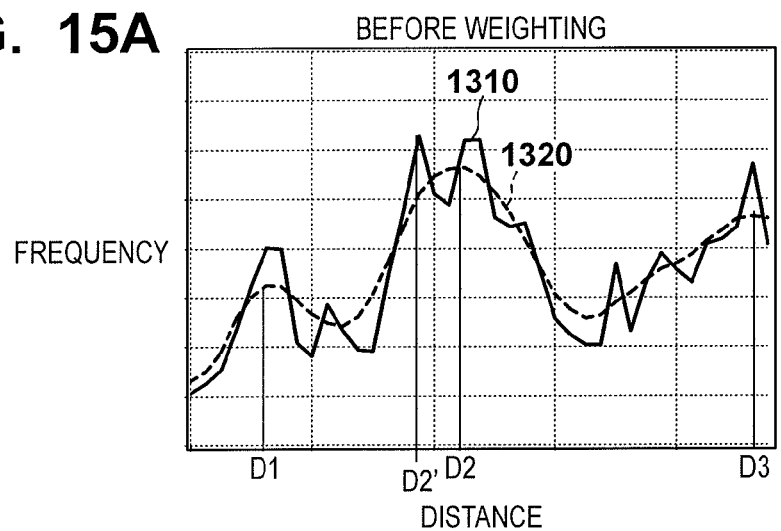
FIGS. 15A and 15B are diagrams showing an exemplary distance histogram in the digital camera according to the third embodiment.
Figure 15B:
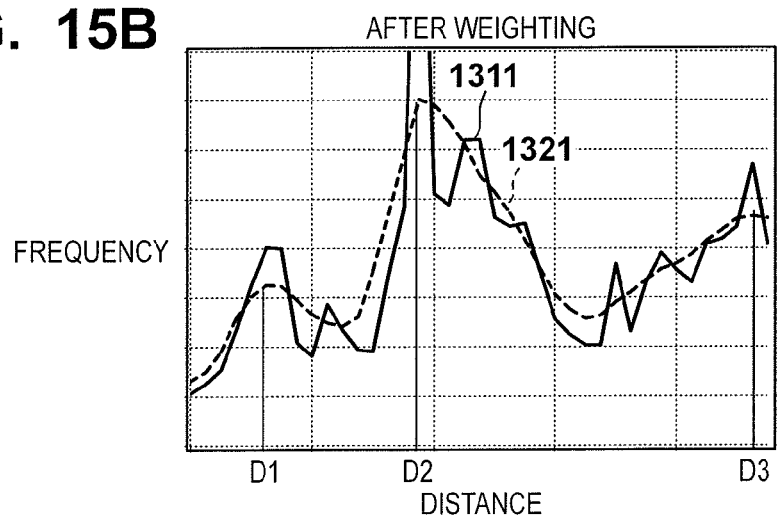

FIGS. 15A and 15B are distance histograms obtained by the histogram generation unit 110 from a range image corresponding to the captured image 1211. FIG. 15A shows a distance histogram generated with the digital camera of the first embodiment, and FIG. 15B shows a distance histogram generated with the digital camera of the present embodiment.

Reference numeral 1310 shown in FIG. 15A denotes the frequency of appearance of pixels for each distance, and reference numeral 1320 denotes the frequency of appearance obtained by smoothing the frequency of appearance 1310. Here, although the focus distance to the person 601 is D2', the frequency peak after smoothing is at a distance D2 due to the presence of a large number of other persons, resulting in a shift. Note that it is assumed that the subject important to the photographer is the person 601, and that it is desirable to suppress the influence of the other persons and to select the focus distance to the person 601. In view of this, in the present embodiment, the influence of other subjects that are close to the subject of interest is suppressed, by generating a distance histogram after weighting the distance to the area of the subject of interest.

Specifically, the frequency of the pixel values (subject distance) included in the area of the range image corresponding to the area of the subject of interest is weighted so as to be greater than the actual frequency. Although the weighting method is not particularly restricted, the frequency per pixel, which is usually 1 frequency per pixel, can be increased to more than 1. Alternatively, the frequency with respect to the focus distance of the subject of interest may be multiplied by a larger coefficient than 1. As a result of these methods, the frequency of the original focus distance D2 increases, enabling the possibility of the focus distance D2 being selected to be enhanced by suppressing the influence of subjects that are in the vicinity thereof.

FIG. 15B shows a distance histogram 1311 generated after weighting the frequency distribution for the area in which the subject of interest was detected, and a smoothed histogram 1321. Here, the subject identification function of the image processing unit 107 is assumed to have identified the person 601 as being the person who is important to the photographer, from the feature amount that was extracted from the image pattern of the face portion of the person 601 and the feature amounts of persons important to the photographer that are stored in advance in the recording medium. In comparison with FIG. 15A, in the histogram of FIG. 15B, the frequency of appearance of the focus distance to the person 601 increases due to weighting, and the focus distance D2 is detected as a peak and selected as the focus distance to be used in image capture.

Note that the specific weighting value can determined through testing, for example.

Thus, according to the present embodiment, it is possible to capture an image focused on the subject of interest, even in the case where other subjects are present around the vicinity of the subject of interest, by weighting in the frequency of the distance corresponding to the subject of interest. Note that it is not essential to perform person identification, and weighting may be performed with the area of the detected subject of interest regarded as an important subject. Also, an area obtained by allowing the user to designate an area of the electronic viewfinder display screen may be set as the area of the subject of interest, rather than automatically detecting an area.

Fourth embodiment

Next, a fourth embodiment will be described. The present embodiment differs from the second embodiment in that the depth of field at the time of image capture is also changed according to the subject, in addition to the focus distance, when capturing a plurality of images. Hereinafter, description will be given focusing on the differences from the second embodiment.

The method of determining the focus distance and the depth of field at the time of the digital camera of the present embodiment capturing a plurality of captured images to be used in generating a combined image having an expanded depth of field will be described, with reference to FIGS. 16A to 17C.

Figure 16A:
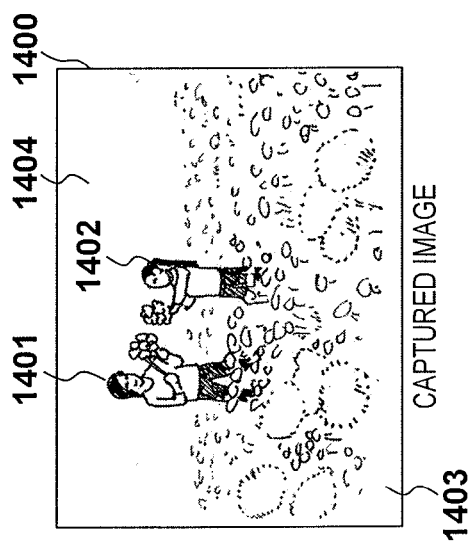
FIGS. 16A to 16D are diagrams showing exemplary captured images captured by a digital camera according to a fourth embodiment during electronic viewfinder display operation and exemplary areas divided by subject.

FIG. 16A is a diagram schematically showing an exemplary captured image that was captured during electronic viewfinder display operation.

In a captured image 1400, persons 1401 and 1402 are positioned substantially in the middle of the screen, with a field of flowers in a foreground 1403 and the sky in a background 1404. Here, the persons 1401 and 1402, being comparatively small relative to the other subjects and not having range in the depth direction, will be in focus even with a shallow depth of field. In contrast, the flower garden 1403 has a large range in the depth direction, and the range that is in focus will be narrow if the depth of field is not increased. So as to be able to favorably expand the depth of field, in the present embodiment, conditions at the time of image capture are set so as to realize a depth of field that depends on the size of the range of the subject in depth direction.

The image processing unit 107 of the present embodiment has a function of discriminating subjects within an image capture scene. A functional block that provides this discrimination function may be provided separately to the image processing unit 107. Subject discrimination can be realized, for example, by dividing the captured image into a plurality of areas (e.g., square areas of the same size), and comparing the features of each area with the features of subjects registered in advance. The image processing unit 107 (subject discrimination unit) acquires, for pixels within each area, luminance, color (hue, chroma), the spatial frequency spectrum, the difference from adjacent areas, the size obtained by adding together areas having little difference, focus distance, and the like. An area that satisfies features that are determined in advance for each predetermined subject, such as sky, flowers, buildings and persons, is then determined to be the area of a specific type of subject. The captured image can thereby be divided into subject-specific areas.

Figure 16D:
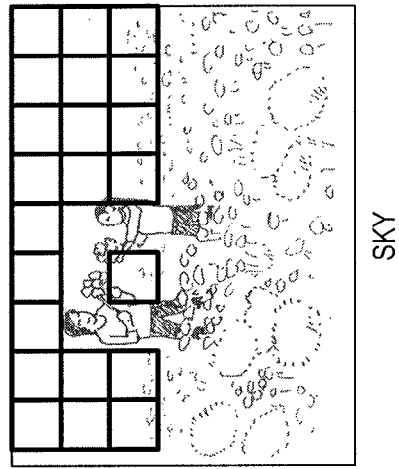
Figure 16C:
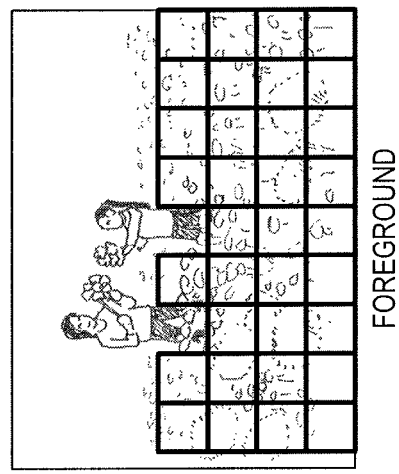
Figure 16B:
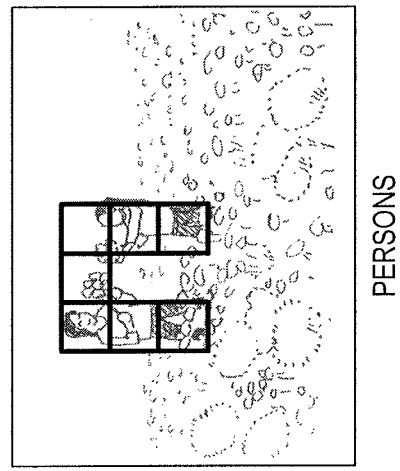

FIGS. 16B to 16D are exemplary results of subject detection performed on the captured image 1400, with areas divided according to subject type being shown in blocks. Specifically, FIG. 16B shows square areas discriminated as being persons serving as the subject of interest, FIG. 16C shows square areas discriminated as being a field of flowers in the foreground, and FIG. 16D shows square areas discriminated as being sky in the background.

Figure 17A:
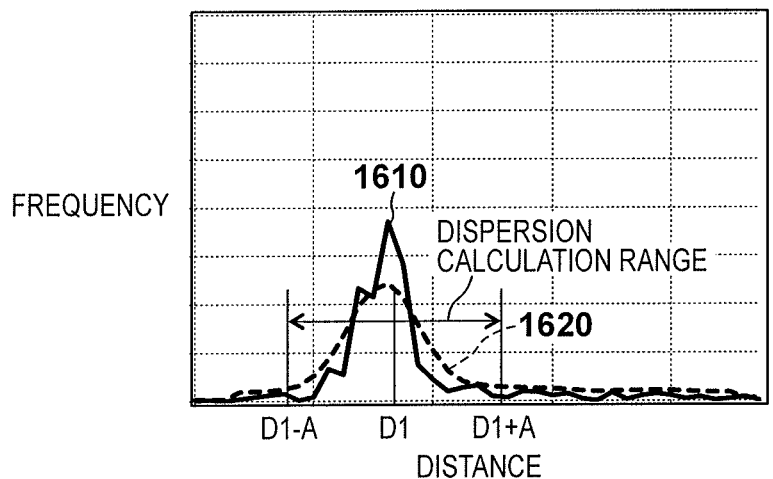
FIGS. 17A to 17C are diagrams showing exemplary distance histograms generated with respect to the subject-specific areas in FIGS. 16A to 16D.
Figure 17B:
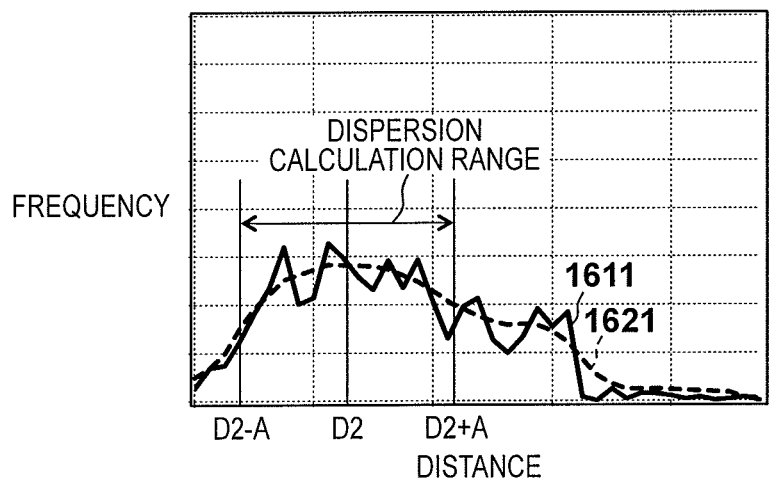
Figure 17C:
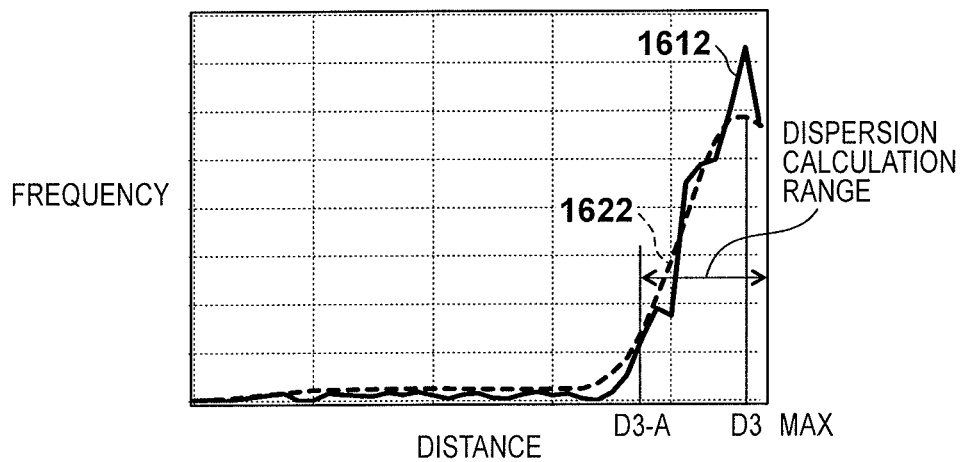

FIGS. 17A and 17C show exemplary distance histograms generated on the basis of range images by the histogram generation unit 110 for respective areas divided by subject. FIG. 17A is a distance histogram relating to the area of the person subjects (subjects of interest) in FIG. 16B, with the range in the depth direction being small, and the frequency of appearance being concentrated in a narrow distance range that peaks at the distance D1.

In the present embodiment, the dispersion of the frequency of appearance is derived in a range (D1±A) having a predetermined width A before and after the peak of the distance histogram. Since the distance histogram of FIG. 17A has a comparatively small distribution and there is not much depth of subject, it is determined that the subject focus range is adequate even though the depth of field is shallow. In this case, the system control unit 104, when performing image capture at the focus distance D1, adjusts the image capture conditions from conditions that would be determined in program mode, for example, such as opening up the aperture of the image capture optical system 101 and/or increases the shutter speed, for example, to shorten the depth of field.

Also, FIG. 17B is a distance histogram relating to the foreground area of FIG. 16C. Since the dispersion of the frequency of appearance of a range of D2±A in this distance histogram is comparatively large, it is determined that the depth of the subject is comparatively large. In this case, since the focus range in the depth direction of the subject is narrow when the depth of field is shallow, the system control unit 104, in the case of performing image capture at the focus distance D2, closes down the aperture and/or reduces the shutter speed, for example, to increase the depth of field.

The dispersion in a range before and behind the peak of the distance histogram shown in FIG. 17C is also derived for the background area of FIG. 16D. Note that, in the example of FIG. 17C, since (D3+A) exceeds a maximum distance MAX, the dispersion is derived in a range from (D3−A) to MAX. Since the dispersion relating to the background area is comparatively small, image capture is performed with a shallow depth of field, similarly to the person area.

The effect of obtaining a captured image having an adequate focus range in the depth direction for a subject having a large depth can be realized by adjusting the depth of field at the time of image capture of a subject having a large dispersion of the frequency distribution before and behind a peak. Accordingly, control for reducing the depth of field need not be performed for subjects whose depth of field need not be reduced, such as shown in FIGS. 17A and 17C. Note that since reducing the depth of field enables a faster shutter speed to be used, the effect of being able to suppress the occurrence of subject blur and camera shake is obtained.

Also, the depth of field derived from the relationship between camera parameters such as the focus distance of the image capture optical system 101 and the size of the image sensor and aperture value and subject distance that are determined by program AE mode or the like may be sufficient for securing the focus range in the depth direction of the subject. In such a case, image capture conditions not need to be changed so that the depth of field is increased. With a focus distance at which image capture of a subject having a large depth is to be performed, it may be determined whether the depth of field resulting from the current image capture parameters are sufficient to secure the focus range in the depth direction of the subject, and the image capture conditions may be changed so as to further increase the depth of field only in the case where it is determined that the depth of field is insufficient. Also, the amount by which the image capture conditions are to be changed may be determined according to the depth of field resulting from the current image capture parameters.

According to the present embodiment, the image capture conditions are set taking into consideration the range of the subject in the depth direction, in the case of capturing a plurality of images having different focus distances in order to generate a combined image having an expanded depth of field. In particular, the depth of field in a combined image can be effectively expanded, by setting the image capture conditions such that the focus range in the depth direction can be sufficiently secured.

Fifth embodiment

The present embodiment is characterized by enabling the depth of field (range of the subject distance that is in focus) to be designated with a specific numerical value, when generating a combined image that combines a plurality of images having different focus distances and widens the depth of field. For example, with the image capture apparatus disclosed in the abovementioned Japanese Patent Laid-Open No. 2009-88742, images are combined without taking the distance to subjects into consideration, and thus an image in which the depth of field has been adjusted on the basis of a specific distance, such as focusing on a range from 4 m to 8 m, for example, cannot be obtained.

Next, an exemplary GUI for setting the adjusted depth of field that is provided by the digital camera 100 of the present embodiment will be described, with reference to FIGS. 18A to 18D. Note that the GUI shown in FIGS. 18A to 18D is displayed by the system control unit 104 reading out GUI data stored in advance in a nonvolatile memory in response to operation of the operation unit 113 and displaying the read GUI data on the display unit 112 through the display image generation unit 111.

Figure 18A:
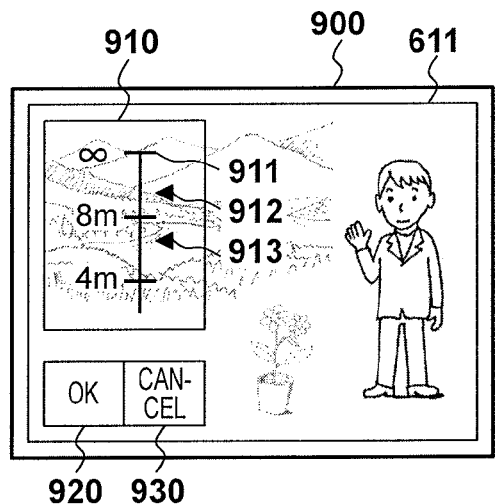
FIGS. 18A to 18D are diagrams for illustrating a method of adjusting the depth of field in a digital camera according to a fifth embodiment.

In FIGS. 18A to 18D, reference numeral 900 denotes a touch display panel (touch panel display) that serves as both the display unit 112 and the operation unit 113 of FIG. 1 (hereinafter, abbreviated to "panel"). In FIG. 18A, a depth-of-field controller 910, an OK button 920 and a cancel button 930 are displayed by being superimposed on the captured image 611 that is read out from the recording medium 115 to the panel 900 and played. A scale 911 showing the distance from the digital camera 100 (subject distance) and two triangular sliders 912 and 913 showing the distance on the near side and the far side of the set depth of field are displayed on the controller 910. In the state showing in FIG. 18A, from the near side of 8 m to the vicinity of 8 m is set as the range of the depth of field.

Figure 18B:
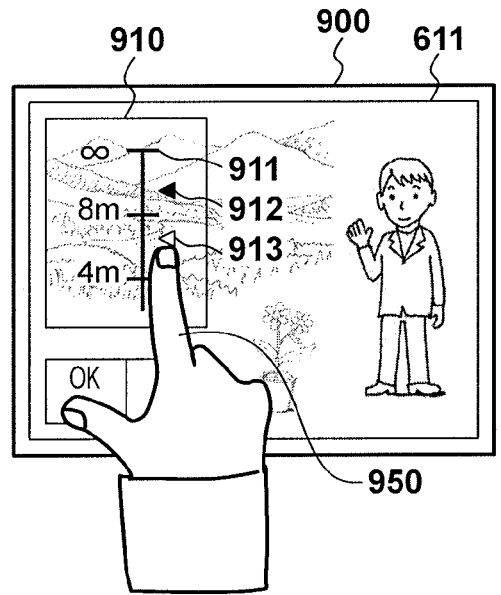

FIG. 18B shows a state where the slider 913 for the user to adjust the distance on the near side of the depth of field with a finger 950 is being touched. The display color of the slider 913 is changed as feedback to having been touched.

Figure 18C:
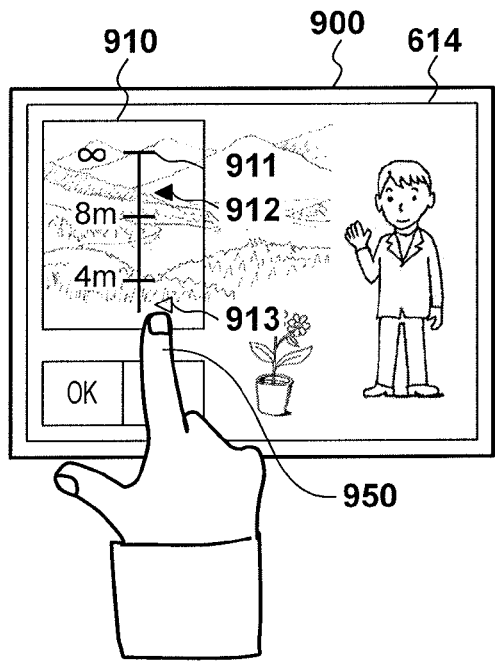
Figure 18D:
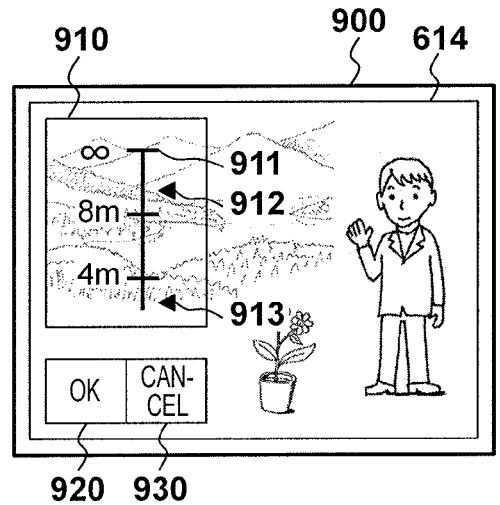

From the state of FIG. 18B, the slider 913 is dragged by the user and moved to a position corresponding to the near side of 4 m, as shown in FIG. 18C. When the positions of the sliders 912 and 913 changes, the system control unit 104 specifies the range of the depth of field corresponding to the current positions of the sliders 912 and 913. Here, it is assumed that the range of the depth of field is now from slightly on the near side of 4 m to the vicinity of 8 m as a result of the slider 913 being dragged. The system control unit 104 then generates a combined image that realized the designated range of the depth of field using the captured images 612 and 613 belonging to same group as the captured image 611 that were captured at other focus distances, and displays the combined image on the panel 900 (FIG. 18C). In this way, the user is able to change the depth of field settings by dragging the sliders 912 and 913, and to check the combined image corresponding to the changed settings. When the finger 950 is removed in the state of FIG. 18C, the color of the slider 913 returns to its original color (FIG. 18D).

Here, the case where the near-side end position of the depth of field was changed using the slider 913 was described as an example, although it is also possible to change the far-side end position of the depth of field by adjusting the slider 912. For example, the depth of field can also be expanded to infinity. Also, it is possible to conversely narrow the depth of field to its original range, to set only the vicinity of 4 m as the range of the depth of field, or to set only the vicinity of infinity as the range of the depth of field. Also, a configuration may be adopted in which a specific numerical value is directly designated.

Note that the GUI for setting and changing the range of the depth of field is not limited to sliders, and GUIs having arbitrary forms capable of setting a range can be used. It is also possible to use hardware buttons or keys or to use audio, rather than using a touch panel. Also, not only a method of setting both ends of the range but also methods such as setting only the centre distance of the depth of field may be used.

If the determination button 920 is touched, the system control unit 104 encodes the combined image currently being displayed, and records the resultant combined image in the recording medium 115. Also, if the cancel button 930 is touched, the system control unit 104 may discard the combined image being displayed, end display of the depth of field adjustment GUI, and return to the menu screen at the top.

Figure 19:
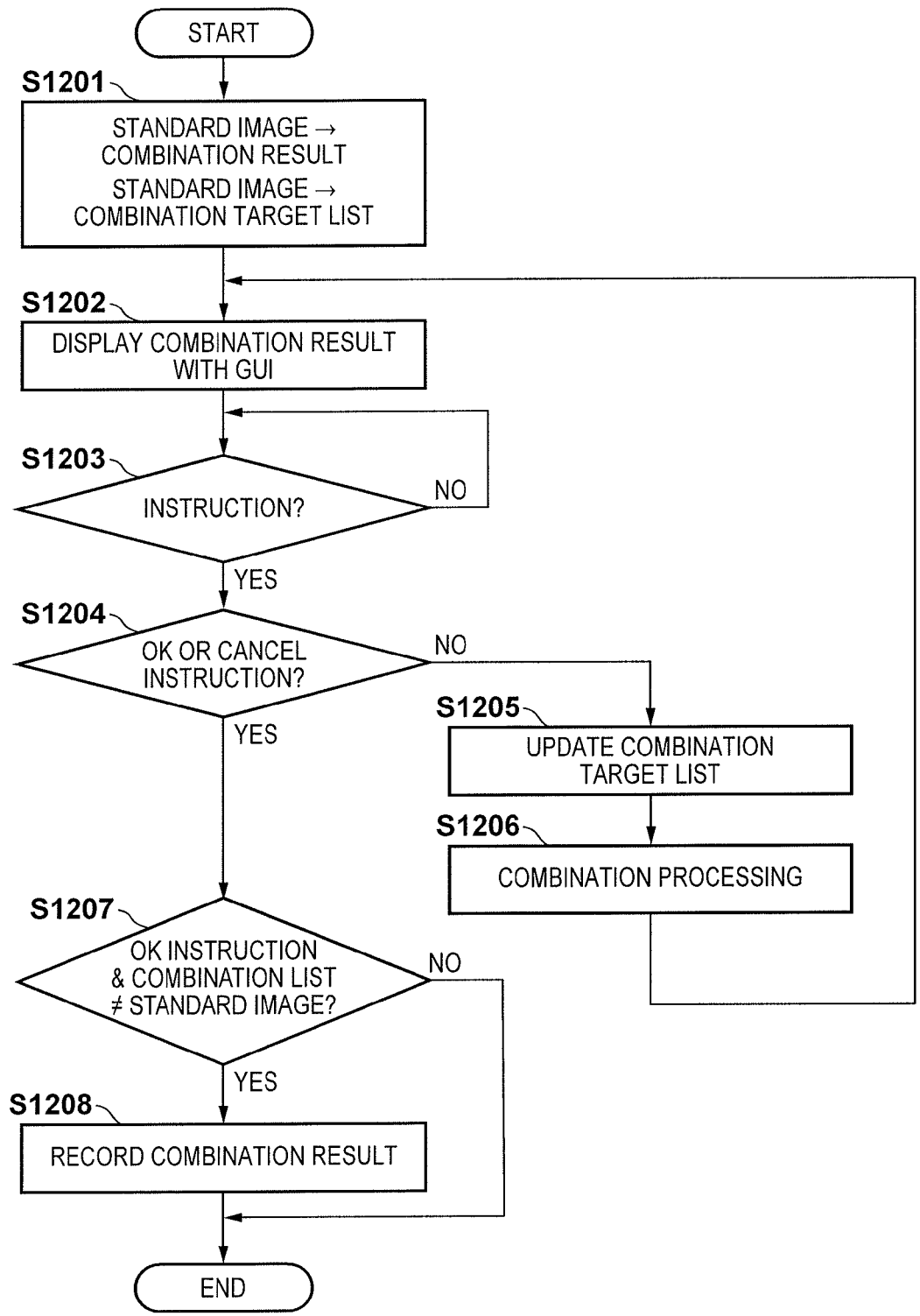
FIG. 19 is a flowchart for illustrating combination processing by the digital camera according to the fifth embodiment.

Next, combination processing for generating a combined image corresponding to changed settings when the depth of field settings are changed by a user instruction through the operation unit 113 will be described, with reference to the flowchart of FIG. 19.

At S1201, the system control unit 104 sets the first of the plurality of captured images recorded in one image file as the standard image, and sets this standard image as the initial state of the combination result. Also, the system control unit 104 initializes a combination target list that lists combined images to a state in which only the standard image is registered.

At S1202, the system control unit 104, as shown in FIG. 18A, displays the combination result on the display unit 112 (panel 900) together with a GUI for setting of the depth-of-field range, through the display image generation unit 111. When S1202 is first executed, the standard image is directly displayed, rather than a combined image.

At S1203, the system control unit 104 waits for a user instruction through the operation unit 113 (panel 900).

At S1204, the system control unit 104 determines whether the user instruction is an OK instruction given by touching the OK button 920, a cancellation instruction given by touching the cancel button 930, or another instruction.

The system control unit 104, in the case where the user instruction is neither an OK instruction nor a cancellation instruction, determines that the user instruction is a depth-of-field adjustment instruction given using the slider 912 or 913, and, at S1205, updates the combination target list according to the position of the sliders 912 and 913. For example, in the case where the depth of field is set as shown in FIG. 18C, the combination list is changed to a state in which the captured image 611 that was captured at a focus distance of 8 m and the captured image 612 that was captured in 4 m at a focus distance are registered. Note that the relationship between the range of the depth of field and the focus distance of captured images to be registered in the combination list is assumed to be stored in advance.

At S1206, the system control unit 104 computes the combination ratio of the captured images registered in the combination list using the combination ratio calculation unit 116 as described in the first embodiment. The system control unit 104 then generates a combined image with the image combining unit 117 in accordance with the combination ratio, and returns the processing to S1202. As shown in FIG. 18C, the result of changing the depth of field settings can thereby be fed back directly to the user. Note that in the case where three or more captured images are to be combined, as described in the abovementioned embodiments, a combined image is generated from a pair of images having a short focus distance, and subsequently combining of the previously generated combined image with the captured image having the shortest focus distance among the captured images that have not been combined is repeatedly executed.

On the other hand, if the user instruction at S1204 is an OK instruction or a cancellation instruction, the system control unit 104 determines, at S1207, whether the user instruction is an OK instruction, and whether any images other than the standard image are registered in the combination list.

If the user instruction is an OK instruction, and an image other than the standard image is registered in the combination list, the system control unit 104, at S1208, encodes the combined image with the encoding/decoding unit 114, records the resultant combined image in the recording medium 115, and ends the depth-of-field adjustment processing.

Also, if the user instruction is a cancellation instruction or only the standard image is registered in the combination list, the system control unit 104 interrupts the depth-of-field adjustment processing and ends the processing.

In this way, according to the present embodiment, the user is able to adjust the depth of field with specific values, because a GUI that enables the depth of field of a combined image to be designated or changed with specific distances, such as a range from 4 m to 8 m, for example, is provided. Also, because a combined image reflecting the changed depth of field is fed back, the user is easily able to obtain a desired image.

Sixth embodiment

Next, a sixth embodiment will be described. The present embodiment differs from the abovementioned embodiments in that calculation of the combination ratio is performed using one range image serving as a standard range image. Hereinafter, description will be given focusing on the differences from the first embodiment.

The digital camera 100 of the present embodiment records a range image for only one image serving as a standard image, when recording images captured at a plurality of focus distances determined similarly to the first embodiment in one file. The standard image is an image recorded at the head of the file, and is the image having the shortest focus distance, for example.

Figure 20:
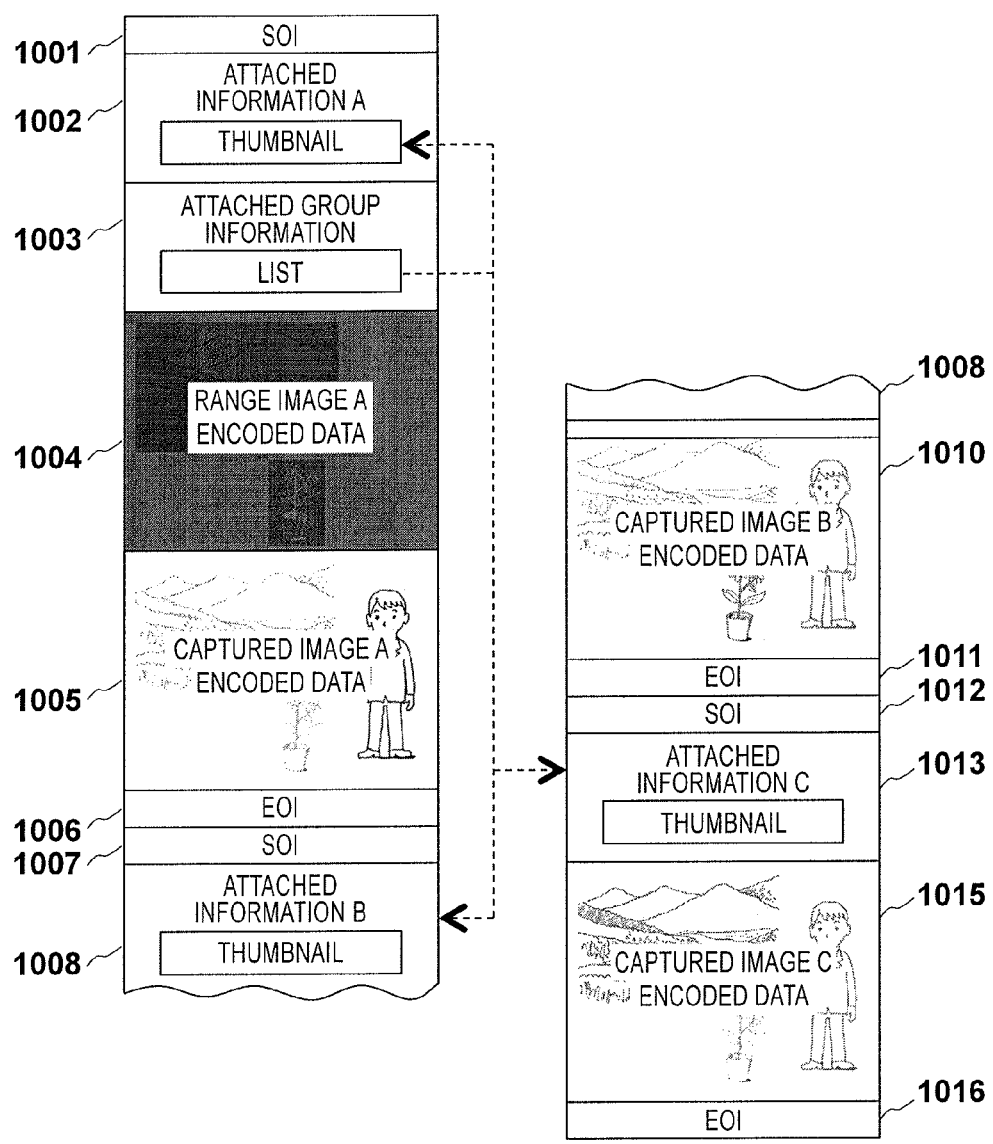
FIG. 20 is a diagram showing an exemplary structure of an image file that is recorded by a digital camera according to a sixth embodiment.

FIG. 20 shows the structure of the image file generated by the digital camera 100 of the present embodiment, and the same reference numerals are given to components that are the same as FIG. 11. The encoded image data 1004 of the range image is recorded for the captured image that was recorded first, as is clear from comparison with FIG. 11. Also, group information 1303 is added to the information described in the first embodiment, and includes information indicating whether a range image is included in each frame image.

Next, the method of computing the combination ratio of the captured images in the digital camera 100 of the present embodiment will be described, with reference to FIGS. 21A and 21B. As abovementioned, only one range image is recorded in an image file, and the combination ratio is computed using this range image.

Figure 21A:
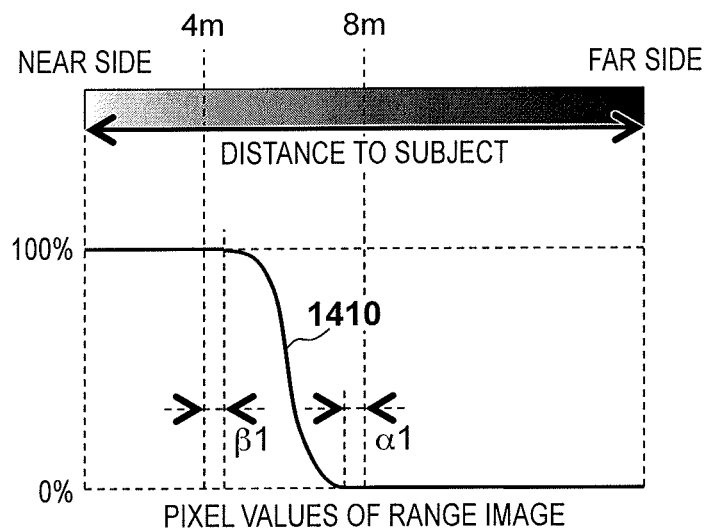
FIGS. 21A and 21B are diagrams showing exemplary combination ratios computed by a combination ratio calculation unit in the sixth embodiment.
Figure 21B:
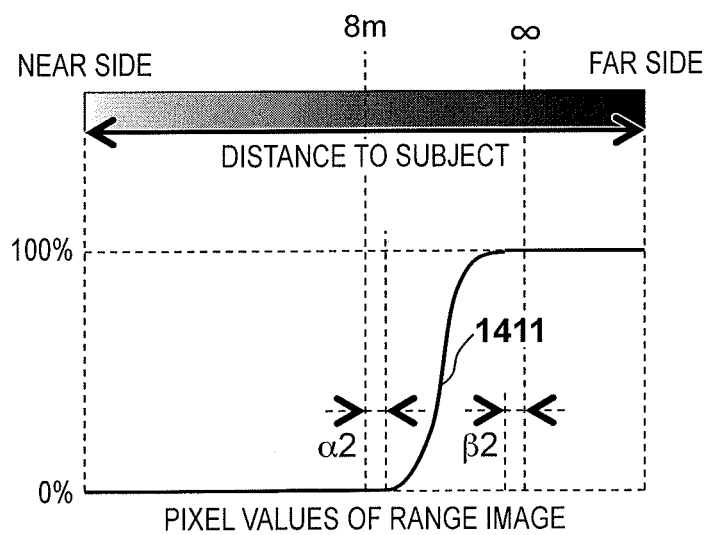

FIGS. 21A and 21B are diagrams showing exemplary combination ratios computed by the combination ratio calculation unit 116 of the present embodiment.

A combination ratio curve 1410 shows an exemplary combination ratio of the captured image 611 (focus distance of 8 m) and the captured image 612 (focus distance of 4 m) when expanding the depth of field to a range from the vicinity of 4 m to the vicinity of 8 m. The combination ratio curve 1410, unlike the first embodiment, changes with respect to the pixel values of the range image 621 corresponding to the captured image 611 that serves as a standard captured image.

In this example, the combination ratio of the captured image 612 is set to 0% with respect to distances greater than or equal to $(8-\alpha 1)$ m. Then, at a distance from $(8-\alpha 1)$ m to $(4+\beta 1)$ m, the ratio of the captured image 612 is increased as the distance decreases, and the combination ratio of the captured image 612 is set to 100% at distance less than or equal to $(4+\beta 1)$ m. In this way, the pixels of the captured image 612 are directly used as combined pixels in areas in which subjects appear on the near side of the vicinity of 4 m, and the pixels of the captured image 611 are used directly as combined pixels in areas in which subjects appear on the far side of the vicinity of 8 m. Then, at distances from $(8-\alpha 1)$ m to $(4+\beta 1)$ m, pixels combined at a higher combination ratio of the captured image 612 the shorter the distance are used as combined pixel. Note that the values $\alpha 1$ and $\beta 1$ can be set in advance according to conditions such as the depth of field and the interval between the focus distances of the two images.

A combination ratio curve 1411 shows an exemplary combination ratio of the captured image 613 relative to the combined image at the time of combining the captured image 613 with the combined image of the captured images 611 and 612 and expanding the depth of field to a range further in the vicinity of infinity. The combination ratio curve 1411 also changes with respect to the pixel values of the range image 621 corresponding to the captured image 611 used as a standard captured image.

In this example, the combination ratio of the captured image 613 is set to 0% for distances less than or equal to $(8+\alpha 2)$ m, and the pixels of the combined image are directly used as combined pixels. Also, with regard to distances from $(8+\alpha 2)$ m to $(\text{infinity}-\beta 2)$ m, the combination ratio of the captured image 613 is increased as the distance increases, and at distances greater than or equal to $(\text{infinity}-\beta 2)$ m, the combination ratio of the captured image 613 is set to 100%, and the pixels of the captured image 613 are directly used as combined pixels. In this way, the combined image is directly used in areas in which subjects appear on the near side of $(8+\alpha 2)$ m, and in areas in which subjects appear beyond (vicinity of infinity-$\beta 2$), the captured image 613 is directly used. Also, at distances from $(8+\alpha 2)$ m to $(\text{infinity}-\beta 2)$ m, pixels combined at a higher combination ratio of the captured image 613 the greater the distance are used as combined pixels. Note that the values $\alpha 2$ and $\beta 2$ can be set in advance according to conditions such as the depth of field and the interval between the focus distances of the two images.

According to the present embodiment, since a range image need only be generated for the standard image, the processing costs relating to generation of range images can be reduced. The capacity of image files can be reduced.

Other embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-112375, filed on May 28, 2013, which is hereby incorporated by reference herein its entirety.

What is claimed is:

1. An image processing apparatus comprising:
a processor; and
a memory including instructions that, when executed by the processor, cause the processor to:
obtain depth information according to subject distances subjects its an image captured by an image capture unit;
select a plurality of subject distances based on peaks in a frequency distribution of the depth information; and
control the image capture unit to capture a plurality of images whose focus distances correspond to the plurality of selected subject distances, respectively;
wherein the frequency distribution of the depth information is based on a range image generated from a pair of captured images constituting stereoscopic images, and
wherein the image capture unit comprises;
an image sensor in which a plurality of pixels each having a plurality of photoelectric conversion areas are arranged, and that is capable of outputting the pair of captured images.

2. The image processing apparatus according to claim 1, wherein the instructions further cause the processor to control the image capture unit to capture the plurality of images in order from a shortest distance among the focus distances corresponding to the plurality elected subject distances.

3. The image processing apparatus according to claim 1, wherein the instructions further cause the processor to:
detect a subject of interest from an image captured by the image capture unit; and
select the plurality of subject distances so as to include a subject distance corresponding to the subject of interest.

4. The image processing apparatus according to claim 1, wherein the instructions further cause the processor to
detect a subject of interest from an image captured by the image capture unit; and
perform weighting such that a frequency of the subject distance depth information corresponding to the subject of interest increases.

5. The image processing apparatus according claim 1, wherein the instructions further cause the processor to
change an image capture condition of the image capture unit based on the frequency distribution of the depth information.

6. An image processing apparatus comprising:
a processor; and
a memory including instructions that, when executed by the processor, cause the processor to:
obtain depth information according to subject distances of subjects in an image captured by an image capture unit;
select a plurality of subject distances based on peaks in a frequency distribution, depth information; and
control the image capture unit to, capture a plurality of images whose focus distances correspond to the plurality of selected subject distances, respectively;
wherein the frequency distribution of the depth information is based on a range, image generated form a pair of captured images constituting stereoscopic images, and
wherein the instructions further cause the processor to:
combine at least two of the plurality of images and generate a combined image having an expanded depth of field.

7. The image processing apparatus according to claim 6, wherein the instructions further cause the processor to
determine mages to be combined from the plurality of images according to a depth of field set by the user.

8. The image processing apparatus according to claim 6, wherein the instructions further cause the processor to:
obtain a combination ratio per pixel based on pixel values of the range image; and
combine at least two of the plurality of images in accordance with the combination ratio in order to generate the combined image.

9. The image processing apparatus according to claim 8, wherein the instructions further cause the processor to
obtain the combination ratio of two images to be combined, based on pixel values of the range image corresponding to one of the two images.

10. The image processing apparatus according to claim 8, wherein the instructions further cause the processor to
obtain the combination ratio, based on pixel values of the range image corresponding to a predetermined one of the plurality of images.

11. A method of controlling an image processing apparatus, comprising:
obtaining, depth information according to subject distances subjects n an image captured by image capturing unit;
selecting a plurality of subject distances based on peaks in frequency distribution of the depth information; and
controlling, the image capture unit to capture a plurality of images whose focus distances correspond to the plurality of selected subject distances, respectively;
wherein the frequency distribution of the depth information is based on a range image generated from a pair of captured images constituting stereoscopic images, and
wherein the image capture unit comprises:
an image sensor in which a plurality of pixels each having a plurality of photoelectric conversion areas are arranged, and that is capable of outputting the pair of captured images.

12. A method of controlling an image processing apparatus, comprising:
- obtaining, depth information according to subject distances of subjects in an image captured by an image capturing unit;
- selecting a plurality of subject distances based on peaks in a frequency distribution of the depth information; and
- controlling, the image capture unit to capture a plurality of images whose focus distances correspond to the plurality of selected subject distances, respectively; and
- combining at least two of the plurality of images and generate a combined image having an expanded depth of field,
- wherein the frequency distribution of the depth information is based on a range image generated form a pair of captured images constituting stereoscopic images.

* * * * *